(12) United States Patent
Dubrovsky et al.

(10) Patent No.: US 9,008,835 B2
(45) Date of Patent: Apr. 14, 2015

(54) REMOTE CONTROL SCHEDULER AND METHOD FOR AUTONOMOUS ROBOTIC DEVICE

(75) Inventors: Zivthan Dubrovsky, Waltham, MA (US); Gregg Landry, Gloucester, MA (US); Michael John Halloran, Jamaica Plain, MA (US); James Kenneth Lynch, Georgetown, MA (US)

(73) Assignee: iRobot Corporation, Bedford, MA (US)

( * ) Notice: Subject to any disclaimer, the term of this patent is extended or adjusted under 35 U.S.C. 154(b) by 1397 days.

(21) Appl. No.: 11/166,891

(22) Filed: Jun. 24, 2005

(65) Prior Publication Data
US 2005/0287038 A1 Dec. 29, 2005

Related U.S. Application Data

(60) Provisional application No. 60/582,531, filed on Jun. 24, 2004.

(51) Int. Cl.
| | |
|---|---|
| *G06F 19/00* | (2011.01) |
| *G05B 19/04* | (2006.01) |
| *G05D 1/00* | (2006.01) |
| *G05B 19/409* | (2006.01) |
| *G05D 1/02* | (2006.01) |

(52) U.S. Cl.
CPC ............ *G05D 1/0033* (2013.01); *G05B 19/409* (2013.01); *G05B 2219/34456* (2013.01); *G05B 2219/36159* (2013.01); *G05D 1/0016* (2013.01); *G05D 1/0225* (2013.01); *G05D 1/0242* (2013.01); *G05D 1/0274* (2013.01); *G05D 2201/0203* (2013.01); *G05D 2201/0215* (2013.01)

(58) Field of Classification Search
USPC .............................. 700/245, 257; 701/2, 200
See application file for complete search history.

(56) References Cited

U.S. PATENT DOCUMENTS

| | | | |
|---|---|---|---|
| 1,755,054 | A | 4/1930 | Darst |
| 1,780,221 | A | 11/1930 | Buchmann |

(Continued)

FOREIGN PATENT DOCUMENTS

| | | |
|---|---|---|
| AU | 2003275566 A1 | 6/2004 |
| DE | 2128842 C3 | 12/1980 |

(Continued)

OTHER PUBLICATIONS

Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.

(Continued)

*Primary Examiner* — Nicholas Kiswanto
(74) *Attorney, Agent, or Firm* — Fish & Richardson P.C.

(57) ABSTRACT

A method of scheduling a robotic device enables the device to run autonomously based on previously loaded scheduling information. The method consists of a communication device, such as a hand-held remote device, that can directly control the robotic device, or load scheduling information into the robotic device such that it will carry out a defined task at the desired time without the need for further external control. The communication device can also be configured to load a scheduling application program into an existing robotic device, such that the robotic device can receive and implement scheduling information from a user.

11 Claims, 6 Drawing Sheets

(56) References Cited

U.S. PATENT DOCUMENTS

| | | |
|---|---|---|
| 1,970,302 A | 8/1934 | Gerhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | De |
| 3,678,882 A | 7/1972 | Kinsella |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,152,703 A * | 5/1979 | Ziemke et al. ............... 342/432 |
| 4,175,589 A | 11/1979 | Nakamura et al. |
| 4,175,892 A | 11/1979 | De |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,710,020 A | 12/1987 | Maddox et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |

(56) References Cited

U.S. PATENT DOCUMENTS

| | | |
|---|---|---|
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,105,502 A | 4/1992 | Takashima |
| 5,105,550 A | 4/1992 | Shenoha |
| 5,109,566 A | 5/1992 | Kobayashi et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,220,263 A * | 6/1993 | Onishi et al. .................. 318/587 |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,483,440 A * | 1/1996 | Aono et al. .................. 700/56 |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A * | 6/1997 | Paranjpe .................. 15/319 |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,659,779 A * | 8/1997 | Laird et al. .................. 709/226 |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,959 A | 4/1998 | Kubo et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,777,596 A | 7/1998 | Herbert |
| 5,778,486 A | 7/1998 | Kim |

(56) References Cited

U.S. PATENT DOCUMENTS

| | | |
|---|---|---|
| 5,781,697 A | 7/1998 | Jeong |
| 5,781,960 A | 7/1998 | Kilstrom et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,839,156 A | 11/1998 | Park et al. |
| 5,839,532 A | 11/1998 | Yoshiji et al. |
| 5,841,259 A * | 11/1998 | Kim et al. .................... 318/587 |
| 5,867,800 A | 2/1999 | Leif |
| 5,869,910 A | 2/1999 | Colens |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A * | 7/1999 | McGee ........................... 15/339 |
| 5,933,102 A | 8/1999 | Miller et al. |
| 5,933,913 A | 8/1999 | Wright et al. |
| 5,935,179 A | 8/1999 | Kleiner et al. |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,278 A | 11/2000 | Kobayashi |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,452 B1 * | 4/2002 | Pfister ............................ 701/23 |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,421,870 B1 | 7/2002 | Basham et al. |
| 6,427,285 B1 | 8/2002 | Legatt et al. |
| 6,430,471 B1 | 8/2002 | Kintou et al. |

(56) References Cited

U.S. PATENT DOCUMENTS

| | | | |
|---|---|---|---|
| 6,431,296 B1 | 8/2002 | Won | |
| 6,437,227 B1 | 8/2002 | Theimer | |
| 6,437,465 B1 | 8/2002 | Nishimura et al. | |
| 6,438,456 B1 | 8/2002 | Feddema et al. | |
| 6,438,793 B1 | 8/2002 | Miner et al. | |
| 6,442,476 B1 | 8/2002 | Poropat | |
| 6,443,509 B1 | 9/2002 | Levin et al. | |
| 6,444,003 B1 | 9/2002 | Sutcliffe | |
| 6,446,302 B1 | 9/2002 | Kasper et al. | |
| 6,454,036 B1 | 9/2002 | Airey et al. | |
| D464,091 S | 10/2002 | Christianson | |
| 6,457,206 B1 * | 10/2002 | Judson | 15/320 |
| 6,459,955 B1 | 10/2002 | Bartsch et al. | |
| 6,463,368 B1 | 10/2002 | Feiten et al. | |
| 6,465,982 B1 | 10/2002 | Bergvall et al. | |
| 6,473,167 B1 | 10/2002 | Odell | |
| 6,480,762 B1 | 11/2002 | Uchikubo et al. | |
| 6,481,515 B1 | 11/2002 | Kirkpatrick et al. | |
| 6,490,539 B1 | 12/2002 | Dickson et al. | |
| 6,491,127 B1 | 12/2002 | Holmberg et al. | |
| 6,493,612 B1 | 12/2002 | Bisset et al. | |
| 6,493,613 B2 | 12/2002 | Peless et al. | |
| 6,496,754 B2 * | 12/2002 | Song et al. | 700/245 |
| 6,496,755 B2 | 12/2002 | Wallach et al. | |
| 6,502,657 B2 | 1/2003 | Kerrebrock et al. | |
| 6,504,610 B1 | 1/2003 | Bauer et al. | |
| 6,507,773 B2 | 1/2003 | Parker et al. | |
| 6,525,509 B1 | 2/2003 | Petersson et al. | |
| D471,243 S | 3/2003 | Cioffi et al. | |
| 6,532,404 B2 | 3/2003 | Colens | |
| 6,535,793 B2 | 3/2003 | Allard | |
| 6,540,607 B2 | 4/2003 | Mokris et al. | |
| 6,548,982 B1 | 4/2003 | Papanikolopoulos et al. | |
| 6,553,612 B1 | 4/2003 | Dyson et al. | |
| 6,556,722 B1 | 4/2003 | Russell et al. | |
| 6,556,892 B2 | 4/2003 | Kuroki et al. | |
| 6,557,104 B2 | 4/2003 | Vu et al. | |
| D474,312 S | 5/2003 | Stephens et al. | |
| 6,563,130 B2 | 5/2003 | Dworkowski et al. | |
| 6,571,415 B2 | 6/2003 | Gerber et al. | |
| 6,571,422 B1 | 6/2003 | Gordon et al. | |
| 6,572,711 B2 | 6/2003 | Sclafani et al. | |
| 6,574,536 B1 | 6/2003 | Kawagoe et al. | |
| 6,580,246 B2 | 6/2003 | Jacobs | |
| 6,584,376 B1 | 6/2003 | Van | |
| 6,586,908 B2 | 7/2003 | Petersson et al. | |
| 6,587,573 B1 | 7/2003 | Stam et al. | |
| 6,590,222 B1 | 7/2003 | Bisset et al. | |
| 6,594,551 B2 | 7/2003 | McKinney et al. | |
| 6,594,844 B2 | 7/2003 | Jones | |
| D478,884 S | 8/2003 | Slipy et al. | |
| 6,601,265 B1 | 8/2003 | Burlington | |
| 6,604,021 B2 | 8/2003 | Imai et al. | |
| 6,604,022 B2 | 8/2003 | Parker et al. | |
| 6,605,156 B1 | 8/2003 | Clark et al. | |
| 6,611,120 B2 | 8/2003 | Song et al. | |
| 6,611,734 B2 | 8/2003 | Parker et al. | |
| 6,611,738 B2 | 8/2003 | Ruffner | |
| 6,615,108 B1 | 9/2003 | Peless et al. | |
| 6,615,885 B1 | 9/2003 | Ohm | |
| 6,622,465 B2 | 9/2003 | Jerome et al. | |
| 6,624,744 B1 | 9/2003 | Wilson et al. | |
| 6,625,843 B2 | 9/2003 | Kim et al. | |
| 6,629,028 B2 | 9/2003 | Paromtchik et al. | |
| 6,639,659 B2 | 10/2003 | Granger | |
| 6,658,325 B2 | 12/2003 | Zweig | |
| 6,658,354 B2 | 12/2003 | Lin | |
| 6,658,692 B2 | 12/2003 | Lenkiewicz et al. | |
| 6,658,693 B1 | 12/2003 | Reed | |
| 6,661,239 B1 | 12/2003 | Ozick | |
| 6,662,889 B2 | 12/2003 | De et al. | |
| 6,668,951 B2 | 12/2003 | Won | |
| 6,670,817 B2 | 12/2003 | Fournier et al. | |
| 6,671,592 B1 | 12/2003 | Bisset et al. | |
| 6,687,571 B1 | 2/2004 | Byrne et al. | |
| 6,690,134 B1 | 2/2004 | Jones et al. | |
| 6,690,993 B2 | 2/2004 | Foulke et al. | |
| 6,697,147 B2 | 2/2004 | Ko et al. | |
| 6,711,280 B2 | 3/2004 | Stafsudd et al. | |
| 6,732,826 B2 | 5/2004 | Song et al. | |
| 6,737,591 B1 | 5/2004 | Lapstun et al. | |
| 6,741,054 B2 | 5/2004 | Koselka et al. | |
| 6,741,364 B2 | 5/2004 | Lange et al. | |
| 6,748,297 B2 | 6/2004 | Song et al. | |
| 6,756,703 B2 | 6/2004 | Chang | |
| 6,760,647 B2 | 7/2004 | Nourbakhsh et al. | |
| 6,764,373 B1 | 7/2004 | Osawa et al. | |
| 6,769,004 B2 | 7/2004 | Barrett | |
| 6,774,596 B1 | 8/2004 | Bisset | |
| 6,779,380 B1 | 8/2004 | Nieuwkamp | |
| 6,781,338 B2 | 8/2004 | Jones et al. | |
| 6,809,490 B2 | 10/2004 | Jones et al. | |
| 6,810,305 B2 | 10/2004 | Kirkpatrick | |
| 6,830,120 B1 | 12/2004 | Yashima et al. | |
| 6,832,407 B2 | 12/2004 | Salem et al. | |
| 6,836,701 B2 | 12/2004 | McKee | |
| 6,841,963 B2 | 1/2005 | Song et al. | |
| 6,845,297 B2 * | 1/2005 | Allard | 700/259 |
| 6,856,811 B2 | 2/2005 | Burdue et al. | |
| 6,859,010 B2 | 2/2005 | Jeon et al. | |
| 6,859,682 B2 | 2/2005 | Naka et al. | |
| 6,860,206 B1 | 3/2005 | Rudakevych et al. | |
| 6,865,447 B2 | 3/2005 | Lau et al. | |
| 6,870,792 B2 | 3/2005 | Chiappetta | |
| 6,871,115 B2 | 3/2005 | Huang et al. | |
| 6,883,201 B2 | 4/2005 | Jones et al. | |
| 6,886,651 B1 | 5/2005 | Slocum et al. | |
| 6,888,333 B2 | 5/2005 | Laby | |
| 6,901,624 B2 | 6/2005 | Mori et al. | |
| 6,906,702 B1 | 6/2005 | Tanaka et al. | |
| 6,914,403 B2 | 7/2005 | Tsurumi | |
| 6,917,854 B2 | 7/2005 | Bayer | |
| 6,925,357 B2 | 8/2005 | Wang et al. | |
| 6,925,679 B2 | 8/2005 | Wallach et al. | |
| 6,929,548 B2 | 8/2005 | Wang | |
| D510,066 S | 9/2005 | Hickey et al. | |
| 6,938,298 B2 | 9/2005 | Aasen | |
| 6,940,291 B1 | 9/2005 | Ozick | |
| 6,941,199 B1 | 9/2005 | Bottomley et al. | |
| 6,956,348 B2 | 10/2005 | Landry et al. | |
| 6,957,712 B2 | 10/2005 | Song et al. | |
| 6,960,986 B2 | 11/2005 | Asama et al. | |
| 6,965,209 B2 | 11/2005 | Jones et al. | |
| 6,965,211 B2 | 11/2005 | Tsurumi | |
| 6,968,592 B2 | 11/2005 | Takeuchi et al. | |
| 6,971,140 B2 | 12/2005 | Kim | |
| 6,975,246 B1 | 12/2005 | Trudeau | |
| 6,980,229 B1 | 12/2005 | Ebersole | |
| 6,985,556 B2 | 1/2006 | Shanmugavel et al. | |
| 6,993,954 B1 | 2/2006 | George et al. | |
| 6,999,850 B2 | 2/2006 | McDonald | |
| 7,013,527 B2 | 3/2006 | Thomas et al. | |
| 7,024,278 B2 | 4/2006 | Chiappetta et al. | |
| 7,024,280 B2 | 4/2006 | Parker et al. | |
| 7,027,893 B2 | 4/2006 | Perry et al. | |
| 7,030,768 B2 | 4/2006 | Wanie | |
| 7,031,805 B2 | 4/2006 | Lee et al. | |
| 7,032,469 B2 | 4/2006 | Bailey | |
| 7,041,029 B2 * | 5/2006 | Fulghum et al. | 477/7 |
| 7,042,342 B2 * | 5/2006 | Luo et al. | 340/426.17 |
| 7,053,578 B2 | 5/2006 | Diehl et al. | |
| 7,054,716 B2 * | 5/2006 | McKee et al. | 700/245 |
| 7,055,210 B2 | 6/2006 | Keppler et al. | |
| 7,057,120 B2 | 6/2006 | Ma et al. | |
| 7,057,643 B2 | 6/2006 | Iida et al. | |
| 7,065,430 B2 | 6/2006 | Naka et al. | |
| 7,066,291 B2 | 6/2006 | Martins et al. | |
| 7,069,124 B1 | 6/2006 | Whittaker et al. | |
| 7,079,923 B2 | 7/2006 | Abramson et al. | |
| 7,085,623 B2 | 8/2006 | Siegers | |
| 7,085,624 B2 | 8/2006 | Aldred et al. | |
| 7,113,847 B2 | 9/2006 | Chmura et al. | |
| 7,133,746 B2 | 11/2006 | Abramson et al. | |
| 7,142,198 B2 | 11/2006 | Lee | |

(56) References Cited

U.S. PATENT DOCUMENTS

| | | | |
|---|---|---|---|
| 7,148,458 | B2 | 12/2006 | Schell et al. |
| 7,155,308 | B2 | 12/2006 | Jones |
| 7,167,775 | B2 | 1/2007 | Abramson et al. |
| 7,171,285 | B2 | 1/2007 | Kim et al. |
| 7,173,391 | B2 | 2/2007 | Jones et al. |
| 7,174,238 | B1 | 2/2007 | Zweig |
| 7,188,000 | B2 | 3/2007 | Chiappetta et al. |
| 7,193,384 | B1 | 3/2007 | Norman et al. |
| 7,196,487 | B2 | 3/2007 | Jones et al. |
| 7,201,786 | B2 | 4/2007 | Wegelin et al. |
| 7,206,677 | B2 | 4/2007 | Huldén |
| 7,211,980 | B1 | 5/2007 | Bruemmer et al. |
| 7,225,500 | B2 | 6/2007 | Diehl et al. |
| 7,246,405 | B2 | 7/2007 | Yan |
| 7,248,951 | B2 | 7/2007 | Huldén |
| 7,275,280 | B2 | 10/2007 | Haegermarck et al. |
| 7,283,892 | B1 | 10/2007 | Boillot et al. |
| 7,288,912 | B2 | 10/2007 | Landry et al. |
| 7,318,248 | B1 | 1/2008 | Yan |
| 7,320,149 | B1 | 1/2008 | Huffman et al. |
| 7,324,870 | B2 | 1/2008 | Lee |
| 7,328,196 | B2 | 2/2008 | Peters |
| 7,332,890 | B2 | 2/2008 | Cohen et al. |
| 7,352,153 | B2 | 4/2008 | Yan |
| 7,359,766 | B2 | 4/2008 | Jeon et al. |
| 7,360,277 | B2 | 4/2008 | Moshenrose et al. |
| 7,363,108 | B2 | 4/2008 | Noda et al. |
| 7,388,879 | B2 * | 6/2008 | Sabe et al. ................... 370/466 |
| 7,389,166 | B2 | 6/2008 | Harwig et al. |
| 7,408,157 | B2 | 8/2008 | Yan |
| 7,418,762 | B2 | 9/2008 | Arai et al. |
| 7,424,611 | B2 | 9/2008 | Hino et al. |
| 7,430,455 | B2 | 9/2008 | Casey et al. |
| 7,430,462 | B2 | 9/2008 | Chiu et al. |
| 7,441,298 | B2 | 10/2008 | Svendsen et al. |
| 7,444,206 | B2 | 10/2008 | Abramson et al. |
| 7,448,113 | B2 | 11/2008 | Jones et al. |
| 7,459,871 | B2 | 12/2008 | Landry et al. |
| 7,467,026 | B2 | 12/2008 | Sakagami et al. |
| 7,474,941 | B2 | 1/2009 | Kim et al. |
| 7,503,096 | B2 | 3/2009 | Lin |
| 7,515,991 | B2 | 4/2009 | Egawa et al. |
| 7,555,363 | B2 | 6/2009 | Augenbraun et al. |
| 7,557,703 | B2 | 7/2009 | Yamada et al. |
| 7,568,259 | B2 | 8/2009 | Yan |
| 7,571,511 | B2 | 8/2009 | Jones et al. |
| 7,578,020 | B2 | 8/2009 | Jaworski et al. |
| 7,600,521 | B2 | 10/2009 | Woo |
| 7,603,744 | B2 | 10/2009 | Reindle |
| 7,617,557 | B2 | 11/2009 | Reindle |
| 7,620,476 | B2 | 11/2009 | Morse et al. |
| 7,636,982 | B2 | 12/2009 | Jones et al. |
| 7,647,144 | B2 | 1/2010 | Haegermarck |
| 7,650,666 | B2 | 1/2010 | Jang |
| 7,660,650 | B2 | 2/2010 | Kawagoe et al. |
| 7,663,333 | B2 | 2/2010 | Jones et al. |
| 7,693,605 | B2 | 4/2010 | Park |
| 7,706,917 | B1 | 4/2010 | Chiappetta et al. |
| 7,765,635 | B2 | 8/2010 | Park |
| 7,801,645 | B2 | 9/2010 | Taylor et al. |
| 7,805,220 | B2 | 9/2010 | Taylor et al. |
| 7,809,944 | B2 | 10/2010 | Kawamoto |
| 7,849,555 | B2 | 12/2010 | Hahm et al. |
| 7,853,645 | B2 | 12/2010 | Brown et al. |
| 7,920,941 | B2 | 4/2011 | Park et al. |
| 7,937,800 | B2 | 5/2011 | Yan |
| 7,957,836 | B2 | 6/2011 | Myeong et al. |
| 2001/0004719 | A1 | 6/2001 | Sommer |
| 2001/0013929 | A1 | 8/2001 | Torsten |
| 2001/0020200 | A1 | 9/2001 | Das et al. |
| 2001/0025183 | A1 | 9/2001 | Shahidi |
| 2001/0037163 | A1 | 11/2001 | Allard |
| 2001/0043509 | A1 | 11/2001 | Green et al. |
| 2001/0045883 | A1 | 11/2001 | Holdaway et al. |
| 2001/0047231 | A1 | 11/2001 | Peless et al. |
| 2001/0047895 | A1 | 12/2001 | De et al. |
| 2002/0011367 | A1 | 1/2002 | Kolesnik |
| 2002/0011813 | A1 | 1/2002 | Koselka et al. |
| 2002/0016649 | A1 | 2/2002 | Jones |
| 2002/0021219 | A1 | 2/2002 | Edwards |
| 2002/0027652 | A1 | 3/2002 | Paromtchik et al. |
| 2002/0030142 | A1 * | 3/2002 | James ........................ 244/194 |
| 2002/0036779 | A1 | 3/2002 | Kiyoi et al. |
| 2002/0081937 | A1 | 6/2002 | Yamada et al. |
| 2002/0095239 | A1 | 7/2002 | Wallach et al. |
| 2002/0097400 | A1 | 7/2002 | Jung et al. |
| 2002/0104963 | A1 | 8/2002 | Mancevski |
| 2002/0108209 | A1 | 8/2002 | Peterson |
| 2002/0112742 | A1 | 8/2002 | Bredo et al. |
| 2002/0113973 | A1 | 8/2002 | Ge |
| 2002/0116089 | A1 | 8/2002 | Kirkpatrick |
| 2002/0120364 | A1 | 8/2002 | Colens |
| 2002/0124343 | A1 | 9/2002 | Reed |
| 2002/0153185 | A1 | 10/2002 | Song et al. |
| 2002/0156556 | A1 | 10/2002 | Ruffner |
| 2002/0159051 | A1 | 10/2002 | Guo |
| 2002/0166193 | A1 | 11/2002 | Kasper |
| 2002/0169521 | A1 | 11/2002 | Goodman et al. |
| 2002/0173877 | A1 | 11/2002 | Zweig |
| 2002/0180585 | A1 * | 12/2002 | Kim et al. .................... 340/5.53 |
| 2002/0189871 | A1 | 12/2002 | Won |
| 2003/0009259 | A1 | 1/2003 | Hattori et al. |
| 2003/0019071 | A1 | 1/2003 | Field et al. |
| 2003/0023356 | A1 | 1/2003 | Keable |
| 2003/0024986 | A1 | 2/2003 | Mazz et al. |
| 2003/0025472 | A1 | 2/2003 | Jones et al. |
| 2003/0028286 | A1 | 2/2003 | Glenn et al. |
| 2003/0030399 | A1 | 2/2003 | Jacobs |
| 2003/0058262 | A1 | 3/2003 | Sato et al. |
| 2003/0060928 | A1 | 3/2003 | Abramson et al. |
| 2003/0067451 | A1 | 4/2003 | Tagg et al. |
| 2003/0097875 | A1 | 5/2003 | Lentz et al. |
| 2003/0120389 | A1 | 6/2003 | Abramson et al. |
| 2003/0124312 | A1 | 7/2003 | Autumn |
| 2003/0126352 | A1 | 7/2003 | Barrett |
| 2003/0137268 | A1 | 7/2003 | Papanikolopoulos et al. |
| 2003/0146384 | A1 | 8/2003 | Logsdon et al. |
| 2003/0165373 | A1 * | 9/2003 | Felder et al. ............. 414/331.07 |
| 2003/0192144 | A1 | 10/2003 | Song et al. |
| 2003/0193657 | A1 | 10/2003 | Uomori et al. |
| 2003/0216834 | A1 | 11/2003 | Allard |
| 2003/0221114 | A1 | 11/2003 | Hino et al. |
| 2003/0229421 | A1 | 12/2003 | Chmura et al. |
| 2003/0229474 | A1 | 12/2003 | Suzuki et al. |
| 2003/0233171 | A1 | 12/2003 | Heiligensetzer |
| 2003/0233177 | A1 | 12/2003 | Johnson et al. |
| 2003/0233870 | A1 | 12/2003 | Mancevski |
| 2003/0233930 | A1 | 12/2003 | Ozick |
| 2004/0016077 | A1 | 1/2004 | Song et al. |
| 2004/0020000 | A1 | 2/2004 | Jones |
| 2004/0030448 | A1 | 2/2004 | Solomon |
| 2004/0030449 | A1 | 2/2004 | Solomon |
| 2004/0030450 | A1 | 2/2004 | Solomon |
| 2004/0030451 | A1 | 2/2004 | Solomon |
| 2004/0030570 | A1 | 2/2004 | Solomon |
| 2004/0030571 | A1 | 2/2004 | Solomon |
| 2004/0031113 | A1 | 2/2004 | Wosewick et al. |
| 2004/0049877 | A1 | 3/2004 | Jones et al. |
| 2004/0055163 | A1 | 3/2004 | McCambridge et al. |
| 2004/0056651 | A1 * | 3/2004 | Marietta Bersana ....... 324/207.2 |
| 2004/0068351 | A1 | 4/2004 | Solomon |
| 2004/0068415 | A1 | 4/2004 | Solomon |
| 2004/0068416 | A1 | 4/2004 | Solomon |
| 2004/0074038 | A1 | 4/2004 | Im et al. |
| 2004/0074044 | A1 | 4/2004 | Diehl et al. |
| 2004/0076324 | A1 | 4/2004 | Burl et al. |
| 2004/0083570 | A1 | 5/2004 | Song et al. |
| 2004/0085037 | A1 | 5/2004 | Jones et al. |
| 2004/0088079 | A1 | 5/2004 | Lavarec et al. |
| 2004/0093122 | A1 | 5/2004 | Galibraith |
| 2004/0098167 | A1 | 5/2004 | Yi et al. |
| 2004/0111184 | A1 | 6/2004 | Chiappetta et al. |
| 2004/0111821 | A1 | 6/2004 | Lenkiewicz et al. |
| 2004/0113777 | A1 | 6/2004 | Matsuhira et al. |

(56) References Cited

U.S. PATENT DOCUMENTS

| | | |
|---|---|---|
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0204792 A1 | 10/2004 | Taylor et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0021181 A1 | 1/2005 | Kim et al. |
| 2005/0067994 A1 | 3/2005 | Jones et al. |
| 2005/0085947 A1 | 4/2005 | Aldred et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa et al. |
| 2006/0146776 A1 | 7/2006 | Kim |
| 2006/0190133 A1 | 8/2006 | Konandreas et al. |
| 2006/0190146 A1 | 8/2006 | Morse et al. |
| 2006/0196003 A1 | 9/2006 | Song et al. |
| 2006/0220900 A1* | 10/2006 | Ceskutti et al. .......... 340/825.22 |
| 2006/0259194 A1 | 11/2006 | Chiu |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0114975 A1 | 5/2007 | Cohen et al. |
| 2007/0150096 A1 | 6/2007 | Yeh et al. |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0184518 A1 | 8/2008 | Taylor et al. |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0312429 A1 | 12/2010 | Jones et al. |

FOREIGN PATENT DOCUMENTS

| | | |
|---|---|---|
| DE | 3317376 A1 | 11/1984 |
| DE | 3536907 C2 | 2/1989 |
| DE | 3404202 C2 | 12/1992 |
| DE | 199311014 U1 | 10/1993 |
| DE | 4414683 A1 | 10/1995 |
| DE | 4338841 C2 | 8/1999 |
| DE | 19849978 | 2/2001 |
| DE | 19849978 C2 | 2/2001 |
| DE | 10242257 A1 | 4/2003 |
| DE | 102004038074 | 6/2005 |
| DE | 10357636 A1 | 7/2005 |
| DE | 102004041021 B3 | 8/2005 |
| DE | 102005046813 A1 | 4/2007 |
| DK | 198803389 A | 12/1988 |
| EP | 265542 A1 | 5/1988 |
| EP | 281085 A2 | 9/1988 |
| EP | 307381 A3 | 7/1990 |
| EP | 358628 A3 | 5/1991 |
| EP | 437024 A1 | 7/1991 |

(56) References Cited

FOREIGN PATENT DOCUMENTS

| | | |
|---|---|---|
| EP | 433697 A3 | 12/1992 |
| EP | 479273 A3 | 5/1993 |
| EP | 294101 B1 | 12/1993 |
| EP | 554978 A3 | 3/1994 |
| EP | 0 615 719 | 9/1994 |
| EP | 615719 A1 | 9/1994 |
| EP | 0 792 726 | 9/1997 |
| EP | 861629 A1 | 9/1998 |
| EP | 930040 A3 | 10/1999 |
| EP | 845237 B1 | 4/2000 |
| EP | 1018315 A1 | 7/2000 |
| EP | 1172719 A1 | 1/2002 |
| EP | 1228734 A3 | 6/2003 |
| EP | 1 331 537 | 7/2003 |
| EP | 1380245 | 1/2004 |
| EP | 1380246 A3 | 3/2005 |
| EP | 1553472 A1 | 7/2005 |
| EP | 1557730 | 7/2005 |
| EP | 1642522 A3 | 11/2007 |
| ES | 2238196 B1 | 11/2006 |
| FR | 2601443 B1 | 11/1991 |
| FR | 2 828 589 | 8/2001 |
| GB | 702426 A | 1/1954 |
| GB | 2128842 B | 4/1986 |
| GB | 2213047 A | 8/1989 |
| GB | 2225221 A | 5/1990 |
| GB | 2 283 838 | 5/1995 |
| GB | 2284957 A | 6/1995 |
| GB | 2267360 B | 12/1995 |
| GB | 2300082 B | 9/1999 |
| GB | 2404330 B | 7/2005 |
| GB | 2417354 A | 2/2006 |
| JP | 53021869 U | 2/1978 |
| JP | 53110257 A | 9/1978 |
| JP | 53110257 A2 | 9/1978 |
| JP | 943901 C | 3/1979 |
| JP | 57014726 A2 | 1/1982 |
| JP | 57064217 A | 4/1982 |
| JP | 59005315 B | 2/1984 |
| JP | 59033511 U | 3/1984 |
| JP | 59094005 A | 5/1984 |
| JP | 59099308 U | 7/1984 |
| JP | 59112311 U | 7/1984 |
| JP | 59033511 B | 8/1984 |
| JP | 59120124 U | 8/1984 |
| JP | 59131668 U | 9/1984 |
| JP | 59164973 A | 9/1984 |
| JP | 59184917 A | 10/1984 |
| JP | 2283343 A2 | 11/1984 |
| JP | 59212924 A | 12/1984 |
| JP | 59226909 A | 12/1984 |
| JP | 60089213 | 5/1985 |
| JP | 60089213 U | 6/1985 |
| JP | 60211510 A | 10/1985 |
| JP | 60259895 A | 12/1985 |
| JP | 61023221 A2 | 1/1986 |
| JP | 61097712 A | 5/1986 |
| JP | 61023221 B | 6/1986 |
| JP | 62074018 A | 4/1987 |
| JP | 62070709 U | 5/1987 |
| JP | 62-120510 | 6/1987 |
| JP | 62-154008 | 7/1987 |
| JP | 62164431 U | 10/1987 |
| JP | 6223508 A | 11/1987 |
| JP | 62263507 A | 11/1987 |
| JP | 62189057 U | 12/1987 |
| JP | 63079623 A | 4/1988 |
| JP | 63-183032 | 7/1988 |
| JP | 63158032 A | 7/1988 |
| JP | 63-241610 | 10/1988 |
| JP | 1162454 A | 6/1989 |
| JP | 2-6312 | 1/1990 |
| JP | 2006312 U1 | 1/1990 |
| JP | 2026312 B | 6/1990 |
| JP | 2283343 A | 11/1990 |
| JP | 03 051023 | 3/1991 |
| JP | 3051023 A2 | 3/1991 |
| JP | 3197758 A | 8/1991 |
| JP | 3201903 A | 9/1991 |
| JP | 4019586 B | 3/1992 |
| JP | 4084921 A | 3/1992 |
| JP | 5023269 B | 4/1993 |
| JP | 5091604 A2 | 4/1993 |
| JP | HEI 5-9160 | 4/1993 |
| JP | 5042076 U | 6/1993 |
| JP | 5046246 U | 6/1993 |
| JP | 5150827 A | 6/1993 |
| JP | 5150829 A | 6/1993 |
| JP | 5046239 B | 7/1993 |
| JP | 5054620 U | 7/1993 |
| JP | 5040519 Y2 | 10/1993 |
| JP | 5257527 A | 10/1993 |
| JP | 5257533 A | 10/1993 |
| JP | 5285861 A | 11/1993 |
| jp | 6-3251 | 1/1994 |
| JP | 6003251 Y2 | 1/1994 |
| JP | 06-038912 | 2/1994 |
| JP | 6026312 U | 4/1994 |
| JP | 6137828 A | 5/1994 |
| JP | 6293095 A | 10/1994 |
| JP | 06-327598 | 11/1994 |
| JP | 6105781 B | 12/1994 |
| JP | 7059702 A2 | 3/1995 |
| JP | 07-129239 | 5/1995 |
| JP | 7059702 B | 6/1995 |
| JP | 7222705 A | 8/1995 |
| JP | 7222705 A2 | 8/1995 |
| JP | 7270518 A | 10/1995 |
| JP | 7281742 A2 | 10/1995 |
| JP | 7281752 A | 10/1995 |
| JP | 7-295636 | 11/1995 |
| JP | 7311041 A2 | 11/1995 |
| JP | 7313417 A | 12/1995 |
| JP | 7319542 A | 12/1995 |
| JP | 8-16776 | 1/1996 |
| JP | 8000393 B2 | 1/1996 |
| JP | 8000393 Y2 | 1/1996 |
| JP | 8016241 A2 | 1/1996 |
| JP | 8016776 B2 | 2/1996 |
| JP | 8063229 A2 | 3/1996 |
| JP | 8083125 A | 3/1996 |
| JP | 8083125 A2 | 3/1996 |
| JP | 08-089451 | 4/1996 |
| JP | 8089449 A | 4/1996 |
| JP | 2520732 B2 | 5/1996 |
| JP | 8123548 A | 5/1996 |
| JP | 08-152916 | 6/1996 |
| JP | 8152916 A2 | 6/1996 |
| JP | 2555263 | 8/1996 |
| JP | 8256960 A2 | 10/1996 |
| JP | 8263137 A | 10/1996 |
| JP | 8286741 A2 | 11/1996 |
| JP | 8286744 A2 | 11/1996 |
| JP | 8322774 A | 12/1996 |
| JP | 8322774 A2 | 12/1996 |
| JP | 8335112 A | 12/1996 |
| JP | HEI 8-339297 | 12/1996 |
| JP | 9-43901 | 2/1997 |
| JP | 9043901 A | 2/1997 |
| JP | 9044240 A | 2/1997 |
| JP | 9047413 A | 2/1997 |
| JP | 9066855 A | 3/1997 |
| JP | 9145309 A | 6/1997 |
| JP | 9160644 A | 6/1997 |
| JP | 9160644 A2 | 6/1997 |
| JP | 8-393 | 7/1997 |
| JP | 9-179625 | 7/1997 |
| JP | 9179625 A2 | 7/1997 |
| JP | 9179685 A2 | 7/1997 |
| JP | 9185410 A | 7/1997 |
| JP | 9192069 A2 | 7/1997 |
| JP | 9204223 A2 | 8/1997 |
| JP | 9206258 A | 8/1997 |
| JP | 9206258 A2 | 8/1997 |

(56) References Cited

FOREIGN PATENT DOCUMENTS

| | | |
|---|---|---|
| JP | 9233712 A | 9/1997 |
| JP | 09251318 | 9/1997 |
| JP | 9251318 A | 9/1997 |
| JP | 9265319 A | 10/1997 |
| JP | 9269807 A | 10/1997 |
| JP | 9269810 A | 10/1997 |
| JP | 02555263 Y2 | 11/1997 |
| JP | 9319431 A2 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10117973 A2 | 5/1998 |
| JP | 10118963 A | 5/1998 |
| JP | 10177414 A | 6/1998 |
| JP | 10214114 A | 8/1998 |
| JP | 10214114 A2 | 8/1998 |
| JP | 10228316 | 8/1998 |
| JP | 10240342 A2 | 9/1998 |
| JP | 10260727 A2 | 9/1998 |
| JP | 10295595 A | 11/1998 |
| JP | 11015941 A | 1/1999 |
| JP | 11065655 A2 | 3/1999 |
| JP | 11085269 A2 | 3/1999 |
| JP | 11102219 A2 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11178764 A | 7/1999 |
| JP | 11178765 A | 7/1999 |
| JP | 11-508810 | 8/1999 |
| JP | 11212642 A | 8/1999 |
| JP | 11212642 A2 | 8/1999 |
| JP | 11213157 A | 8/1999 |
| JP | 11-510935 | 9/1999 |
| JP | 11248806 A | 9/1999 |
| JP | 11282532 A | 10/1999 |
| JP | 11282533 A | 10/1999 |
| JP | 11295412 A | 10/1999 |
| JP | 11346964 A2 | 12/1999 |
| JP | 2000047728 A | 2/2000 |
| JP | 2000056006 A | 2/2000 |
| JP | 2000056831 A | 2/2000 |
| JP | 2000066722 A | 3/2000 |
| JP | 2000075925 A | 3/2000 |
| JP | 10240343 A2 | 5/2000 |
| JP | 2000275321 A | 10/2000 |
| JP | 11-162454 | 12/2000 |
| JP | 2000353014 A | 12/2000 |
| JP | 2000353014 A2 | 12/2000 |
| JP | 2001022443 A | 1/2001 |
| JP | 2001067588 A | 3/2001 |
| JP | 2001087182 A | 4/2001 |
| JP | 2001087182 A | 4/2001 |
| JP | 2001121455 A | 5/2001 |
| JP | 2001125641 A | 5/2001 |
| JP | 2001-121455 | 8/2001 |
| JP | 2001-216482 | 8/2001 |
| JP | 2001216482 A | 8/2001 |
| JP | 2001-258807 | 9/2001 |
| JP | 2001265437 A | 9/2001 |
| JP | 2001-275908 | 10/2001 |
| JP | 2001289939 A | 10/2001 |
| JP | 2001-306170 | 11/2001 |
| JP | 2001306170 A | 11/2001 |
| JP | 2001320781 A | 11/2001 |
| JP | 2001-525567 | 12/2001 |
| JP | 2002-78650 | 3/2002 |
| JP | 2002-204768 | 7/2002 |
| JP | 2002204769 A | 7/2002 |
| JP | 2002-247510 | 8/2002 |
| JP | 2002247510 A | 8/2002 |
| JP | 2002-532178 | 10/2002 |
| JP | 3356170 | 10/2002 |
| JP | 2002-323925 | 11/2002 |
| JP | 3375843 | 11/2002 |
| JP | 2002333920 A | 11/2002 |
| JP | 2002-355206 | 12/2002 |
| JP | 2002-360471 | 12/2002 |
| JP | 2002-360482 | 12/2002 |
| JP | 2002360479 A | 12/2002 |
| JP | 2002366227 A | 12/2002 |
| JP | 2002369778 A | 12/2002 |
| JP | 2002369778 A2 | 12/2002 |
| JP | 2003-10076 | 1/2003 |
| JP | 2003-30157 | 1/2003 |
| JP | 2003010076 A | 1/2003 |
| JP | 2003010088 A | 1/2003 |
| JP | 2003015740 A | 1/2003 |
| JP | 2003028528 A | 1/2003 |
| JP | 2003-5296 | 2/2003 |
| JP | 2003-036116 | 2/2003 |
| JP | 2003-38401 | 2/2003 |
| JP | 2003-38402 | 2/2003 |
| JP | 2003-505127 | 2/2003 |
| JP | 2003047579 A | 2/2003 |
| JP | 2003052596 A | 2/2003 |
| JP | 2003-061882 | 3/2003 |
| JP | 2003-84994 | 3/2003 |
| JP | 2003084994 A | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003190064 A2 | 7/2003 |
| JP | 2003241836 A | 8/2003 |
| JP | 2003262520 A | 9/2003 |
| JP | 2003285288 A | 10/2003 |
| JP | 2003304992 A | 10/2003 |
| JP | 2003-310489 | 11/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004174228 A | 6/2004 |
| JP | 2004198330 A | 7/2004 |
| JP | 2004219185 A | 8/2004 |
| JP | 2005118354 A | 5/2005 |
| JP | 2005135400 A | 5/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005296511 A | 10/2005 |
| JP | 2005346700 A2 | 12/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 04074285 B2 | 4/2008 |
| JP | 2009015611 A | 1/2009 |
| JP | 2010198552 A | 9/2010 |
| WO | WO 95/26512 | 10/1995 |
| WO | WO 95/30887 | 11/1995 |
| WO | WO9530887 A1 | 11/1995 |
| WO | WO9617258 A3 | 2/1997 |
| WO | WO 97/15224 | 5/1997 |
| WO | WO 97/40734 | 11/1997 |
| WO | WO 97/41451 | 11/1997 |
| WO | WO 98/53456 | 11/1998 |
| WO | WO9905580 A2 | 2/1999 |
| WO | WO 99/16078 | 4/1999 |

(56) References Cited

FOREIGN PATENT DOCUMENTS

| | | |
|---|---|---|
| WO | WO 99/28800 | 6/1999 |
| WO | WO 99/38056 | 7/1999 |
| WO | WO 99/38237 | 7/1999 |
| WO | WO 99/43250 | 9/1999 |
| WO | WO 99/59042 | 11/1999 |
| WO | WO 00/04430 | 1/2000 |
| WO | WO 00/36962 | 6/2000 |
| WO | WO 00/38026 | 6/2000 |
| WO | WO 00/38029 | 6/2000 |
| WO | WO0038028 A1 | 6/2000 |
| WO | WO 00/78410 | 12/2000 |
| WO | WO 01/06904 | 2/2001 |
| WO | WO0106905 A9 | 6/2001 |
| WO | WO0180703 A1 | 11/2001 |
| WO | WO0191623 A2 | 12/2001 |
| WO | WO 02/39864 | 5/2002 |
| WO | WO 02/39868 | 5/2002 |
| WO | WO 02/058527 | 8/2002 |
| WO | WO02062194 A1 | 8/2002 |
| WO | WO 02/067744 | 9/2002 |
| WO | WO 02/067745 | 9/2002 |
| WO | WO02/071175 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO02067752 A1 | 9/2002 |
| WO | WO02069774 A1 | 9/2002 |
| WO | WO02075350 A1 | 9/2002 |
| WO | WO02081074 A1 | 10/2002 |
| WO | WO 02/101477 | 12/2002 |
| WO | WO03015220 A1 | 2/2003 |
| WO | WO03024292 A2 | 3/2003 |
| WO | WO 03/026474 | 4/2003 |
| WO | WO 03/040546 | 5/2003 |
| WO | WO 03/040845 | 5/2003 |
| WO | WO 03/040846 | 5/2003 |
| WO | WO02069775 A3 | 5/2003 |
| WO | WO03040546 A1 | 5/2003 |
| WO | WO03062850 A2 | 7/2003 |
| WO | WO03062852 A1 | 7/2003 |
| WO | WO 2004/006034 | 1/2004 |
| WO | WO2004004533 A1 | 1/2004 |
| WO | WO2004004534 A1 | 1/2004 |
| WO | WO2004005956 A1 | 1/2004 |
| WO | WO2004025947 A3 | 5/2004 |
| WO | WO2004043215 A1 | 5/2004 |
| WO | WO2004/058028 | 7/2004 |
| WO | WO2004/059409 | 7/2004 |
| WO | WO2004058028 | 7/2004 |
| WO | WO2005006935 A1 | 1/2005 |
| WO | WO2005036292 A1 | 4/2005 |
| WO | WO2005055795 A1 | 6/2005 |
| WO | WO2005055796 A2 | 6/2005 |
| WO | WO2005076545 A1 | 8/2005 |
| WO | WO2005077243 A1 | 8/2005 |
| WO | WO2005077244 A1 | 8/2005 |
| WO | WO2005081074 A1 | 9/2005 |
| WO | WO2005082223 A1 | 9/2005 |
| WO | WO2005083541 A1 | 9/2005 |
| WO | WO2005098475 A1 | 10/2005 |
| WO | WO2005098476 A1 | 10/2005 |
| WO | WO2006046400 A1 | 5/2006 |
| WO | WO2006/061133 | 6/2006 |
| WO | WO2006068403 A1 | 6/2006 |
| WO | WO2006073248 A1 | 7/2006 |
| WO | WO2007036490 A3 | 5/2007 |
| WO | WO2007065033 A2 | 6/2007 |
| WO | WO2007137234 A2 | 11/2007 |

OTHER PUBLICATIONS eVac Robotic Vacuum S1727 Instruction Manual, Sharper Image Corp, Copyright 2004, 16 pgs.

Facts on the Trilobite webpage: "http://trilobiteelectroluxse/presskit_en/nodel1335asp?print=yes&pressID=" accessed Dec. 12, 2003 (2 pages).

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004 (16 pages).

Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.

Kärcher RoboCleaner RC 3000 Product Details webpages: "http://wwwrobocleanerde/english/screen3html" through " . . . screen6html" accessed Dec. 12, 2003 (4 pages).

koolvac Robotic Vacuum Cleaner Owner's Manual, Koolatron, Undated, 26 pgs.

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.

NorthStar Low-Cost, Indoor Localization, Evolution robotics, Powering Intelligent Products, 2 pgs.

Put Your Roomba . . . On "Automatic" webpages: "http://www.acomputeredge.com/roomba," accessed Apr. 20, 2005, 5 pgs.

Put Your Roomba . . . On "Automatic" Roomba Timer> Timed Cleaning—Floorvac Robotic Vacuum webpages: http://cgi.ebay.com/ws/eBayISAPI.dll?ViewItem&category=43575198387&rd=1, accessed Apr. 20, 2005, 5 pgs.

Friendly Robotics Robotic Vacuum RV400—The Robot Store website: http://www.therobotstore.com/s.nl/sc.9/category,-109/it.A/id.43/.f, accessed Apr. 20, 2005, 5 pgs.

Zoombot Remote Controlled Vaccum—RV-500 New Roomba 2, website: http://cgi.ebay.com/ws/eBayISAPI.dll?ViewItem&category=43526&item=4373497618&rd=1 , accessed Apr. 20, 2005, 7 pgs.

Everday Robots, website: http://www.everydayrobots.com/index.php?option=content&task=view&id=9, accessed Apr. 20, 2005, 7 pgs.

Robot Review Samsung Robot Vacuum (VC-RP30W), website: http://www.onrobo.com/reviews/At_Home/Vacuun_Cleaners/on00vcrp30rosam/index.htm, accessed Mar. 18, 2005, 11 pgs.

Robotic Vacuum Cleaner—Blue, website: http://www.sharperimage.com/us/en/catalog/productview.jhtml?sku=S1727BLU, accessed Mar. 18, 2005, 3 pgs.

Hitachi: News release: The home cleaning robot of the autonomous movement type (experimental machine) is developed, website: http://www.i4u.com/japanreleases/hitachirobot.htm., accessed Mar. 18, 2005, 5 pgs.

Karcher USA, RC3000 Robotic Cleaner, website: http://www.karcher-usa.com/showproducts.php?op=view_prod&param1=143&param2=&param3=, accessed Mar. 18, 2005, 6 pgs.

Electrolux designed for the well-lived home, website: http://www.electroluxusa.com/node57.as[?currentURL=node142.asp%3F, acessed Mar. 18, 2005, 5 pgs.

RoboMaid Sweeps Your Floors So You Won't Have To, the Official Site, website: http://www.thereobomaid.com/, acessed Mar. 18, 2005, 2 pgs.

Wired News: Robot Vacs Are in the House, website: http://www.wired.com/news/print/0,1294,59237,00.html, accessed Mar. 18, 2005, 6 pgs.

International Search Report for PCT Application No. PCT/US2005/022481, dated Oct. 24, 2005 (5 pgs.).

Written Opinion for PCT Application No. PCT/US2005/022481 dated Oct. 24, 2005 (6 pgs.).

International Search Report for PCT Application No. PCT/US2005/022526, dated Nov. 2, 2005 (5 pgs).

Written Opinion for PCT Application No. PCT/US2005/022526 dated Nov. 2, 2005 (5 pgs.).

(56) References Cited

OTHER PUBLICATIONS

Office action from corresponding JP application 2007-518322 dated Sep. 15, 2010.
Examination report from corresponding application KR 10-2007-7001634.
Examination report dated Apr. 5, 2011 from corresponding application JP 2007-518322.
Paromtchik "Toward Optical Guidance of Mobile Robots".
Piranian et al. "Distributed Control for a Modular, Reconfigurable Cliff Robot", Proceedings of the 2002 IEEE International Conference on Robotics & Automation, Washington, D.C. pp. 4083-4088, May 2002.
Radio Frequency Identification: Tracking ISS Consumables, Author Unknown, 41 pages (NPL0127).
Sebastian Thrun, Learning Occupancy Grid Maps With Forward Sensor Models, School of Computer Science, Carnegie Mellon University, pp. 1-28.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
The Sharper Image "e-Vac Robotic Vacuum, S1727 Instructions" www.sharperimage.com, 18 pages.
Andersen et al., "Landmark based navigation strategies", SPIE Conference on Mobile Robots XIII, SPIE vol. 3525, pp. 170-181, Jan. 8, 1999.
Ascii, Mar. 25, 2002, http://ascii.jp/elem/000/000/330/330024/ accessed Nov. 1, 2011.
U.S. Appl. No. 60/605,066 as provided to WIPO in PCT/US2005/030422, corresponding to U.S. National Stage Entry U.S. Appl. No. 11/574,290, U.S. publication 2008/0184518, filed Aug. 27, 2004.
U.S. Appl. No. 60/605,181 as provided to WIPO in PCT/US2005/030422, corresponding to U.S. National Stage Entry U.S. Appl. No. 11/574,290, U.S. publication 2008/0184518, filed Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Electrolux Trilobite, Jan. 12, 2001, http://www.electrolux-ui.com:8080/2002%5C822%5C833102EN.pdf, accessed Jul. 2, 2012, 10 pages.
Florbot GE Plastics, 1989-1990, 2 pages, available at http://www.fuseid.com/, accessed Sep. 27, 2012.
Gregg et al., "Autonomous Lawn Care Applications," 2006 Florida Conference on Recent Advances in Robotics, Miami, Florida, May 25-26, 2006, Florida International University, 5 pages.
Hitachi 'Feature', http://kadenfan.hitachi.co.jp/robot/feature/feature.html, 1 page, Nov. 19, 2008.
Hitachi, http://www.hitachi.co.jp/New/cnews/hi_030529_hi_030529.pdf, 8 pages, May 29, 2003.
Home Robot—UBOT; Microbotusa.com, retrieved from the WWW at www.microrobotusa.com, accessed Dec. 2, 2008.
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Martishevcky, "The Accuracy of point light target coordinate determination by dissectoral tracking system", SPIE vol. 2591, pp. 25-30, Oct. 23, 2005.
Maschinemarkt Würzburg 105, Nr. 27, pp. 3, 30, Jul. 5, 1999.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.
Paromtchik "Toward Optical Guidance of Mobile Robots," Proceedings of the Fourth World Multiconference on Systemics, Cybernetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
Sebastian Thrun, "Learning Occupancy Grid Maps With Forward Sensor Models," Autonomous Robots 15, 111-127, Sep. 1, 2003.
SVET Computers—New Technologies—Robot Vacuum Cleaner, Oct. 1999, available at http://www.sk.rs/1999/10/sknt01.html, accessed Nov. 1, 2011.
Written Opinion of the International Searching Authority, PCT/US2004/001504, Aug. 20, 2012, 9 pages.
Borges et al. "Optimal Mobile Robot Pose Estimation Using Geometrical Maps", IEEE Transactions on Robotics and Automation, vol. 18, No. 1, pp. 87-94, Feb. 2002.
Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.
Bulusu, et al. "Self Configuring Localization systems: Design and Experimental Evaluation", ACM Transactions on Embedded Computing Systems vol. 3 No. 1 pp. 24-60, 2003.
Caccia, et al. "Bottom-Following for Remotely Operated Vehicies", 5th IFAC conference, Alaborg, Denmark, pp. 245-250 Aug. 1, 2000.
Chae, et al. "StarLITE: A new artificial landmark for the navigation of mobile robots", http://www.irc.atr.jp/jk-nrs2005/pdf/Starlite.pdf, 4 pages, 2005.
Chamberlin et al. "Team 1: Robot Locator Beacon System" NASA Goddard SFC, Design Proposal, 15 pages, Feb. 17, 2006.
Champy "Physical management of IT assets in Data Centers using RFID technologies", RFID 2005 University, Oct. 12-14, 2005 (NPL0126).
Chiri "Joystick Control for Tiny OS Robot", http://www.eecs.berkeley.edu/Programs/ugrad/superb/papers2002/chiri.pdf. 12 pages, Aug. 8, 2002.
Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.
Andersen et al., "Landmark based navigation strategies", SPIE Conference on Mobile Robots XIII, SPIE vol. 3525, pp., 2001.
Clerentin, et al. "A localization method based on two omnidirectional perception systems cooperation" Proc of IEEE International Conference on Robotics & Automation, San Francisco, CA vol. 2, pp. 1219-1224, Apr. 2000.
Corke "High Performance Visual serving for robots end-point control". SPIE vol. 2056 Intelligent robots and computer vision 1993.
Cozman et al. "Robot Localization using a Computer Vision Sextant", IEEE International Midwest Conference on Robotics and Automation, pp. 106-111, 1995.
D'Orazio, et al. "Model based Vision System for mobile robot position estimation", SPIE vol. 2058 Mobile Robots VIII, pp. 38-49, 1992.
De Bakker, et al. "Smart PSD-array for sheet of light range imaging", Proc. of SPIE vol. 3965, pp. 1-12, May 15, 2000.
Desaulniers, et al. "An Efficient Algorithm to find a shortest path for a car-like Robot", IEEE Transactions on robotics and Automation vol. 11 No. 6, pp. 819-828, Dec. 1995.
Dorfmüller-Ulhaas "Optical Tracking From User Motion to 3D Interaction", http://www.cg.tuwien.ac.at/research/publications/2002/Dorfmueller-Ulhaas-thesis, 182 pages, 2002.
Dorsch, et al. "Laser Triangulation: Fundamental uncertainty in distance measurement", Applied Optics, vol. 33 No. 7, pp. 1306-1314, Mar. 1, 1994.
Dudek, et al. "Localizing A Robot with Minimum Travel" Proceedings of the sixth annual ACM-SIAM symposium on Discrete algorithms, vol. 27 No. 2 pp. 583-604, Apr. 1998.
Dulimarta, et al. "Mobile Robot Localization in Indoor Environment", Pattern Recognition, vol. 30, No. 1, pp. 99-111, 1997.
EBay "Roomba Timer -> Timed Cleaning—Floorvac Robotic Vacuum", Cgi.ebay.com/ws/eBayISAPI.dll?viewitem&category=43526&item=4375198387&rd=1, 5 pages, Apr. 20, 2005.

(56) References Cited

OTHER PUBLICATIONS

Electrolux "Welcome to the Electrolux trilobite" www.electroluxusa. com/node57.asp?currentURL=node142.asp%3F, 2 pages, Mar. 18, 2005.
Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95. pp. 548-551, 1995.
Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.
Barker, "Navigation by the Stars—Ben Barker 4th Year Project" Power point pp. 1-20, 1998.
Becker, et al. "Reliable Navigation Using Landmarks" IEEE International Conference on Robotics and Automation, 0-7803-1965-6, pp. 401-406, 1995.
Benayad-Cherif, et al., "Mobile Robot Navigation Sensors" SPIE vol. 1831 Mobile Robots, VII, pp. 378-387, 1992.
Facchinetti, Claudio et al. "Using and Learning Vision-Based Self-Positioning for Autonomous Robot Navigation", ICARCV '94, vol. 3 pp. 1694-1698, 1994.
Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol., 1994.
Facchinetti, Claudio et al. "Self-Positioning Robot Navigation Using Ceiling Images Sequences", ACCV '95, 5 pages, Dec. 5-8, 1995.
Fairfield, Nathaniel et al. "Mobile Robot Localization with Sparse Landmarks", SPIE vol. 4573 pp. 148-155, 2002.
Favre-Bulle, Bernard "Efficient tracking of 3D-Robot Position by Dynamic Triangulation", IEEE Instrumentation and Measurement Technology Conference IMTC 98 Session on Instrumentation and Measurement in Robotics, vol. 1, pp. 446-449, May 18-21, 1998.
Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.
Florbot GE Plastics Image (1989-1990).
Franz, et al. "Biomimetric robot navigation", Robotics and Autonomous Systems vol. 30 pp. 133-153, 2000.
Friendly Robotics "Friendly Robotics—Friendly Vac, Robotic Vacuum Cleaner", www.friendlyrobotics.com/vac.htm. 5 pages Apr. 20, 2005.
Fuentes, et al. "Mobile Robotics 1994", University of Rochester. Computer Science Department, TR 588, 44 pages, Dec. 7, 1994.
Bison, P et al., "Using a structured beacon for cooperative position estimation" Robotics and Autonomous Systems vol. 29, No. 1, pp. 33-40, Oct. 1999.
Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466-1471, Aug. 5-9, 1995.
Gionis "A hand-held optical surface scanner for environmental Modeling and Virtual Reality", Virtual Reality World, 16 pages 1996.
Goncalves et al. "A Visual Front-End for Simultaneous Localization and Mapping", Proceedings of the 2005 IEEE International Conference on Robotics and Automation, Barcelona, Spain, pp. 44-49, Apr. 2005.
Gregg et al. "Autonomous Lawn Care Applications", 2006 Florida Conference on Recent Advances in Robotics, FCRAR 2006, pp. 1-5, May 25-26, 2006.
Hamamatsu "SI PIN Diode S5980, S5981 S5870—Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp?promo=xsells, 3 pages, Mar. 18, 2005.
Haralick et al. "Pose Estimation from Corresponding Point Data", IEEE Transactions on systems, Man, and Cybernetics, vol. 19, No. 6, pp. 1426-1446, Nov. 1989.
Hausler "About the Scaling Behaviour of Optical Range Sensors", Fringe '97, Proceedings of the 3rd International Workshop on Automatic Processing of Fringe Patterns, Bremen, Germany, pp. 147-155, Sep. 15-17, 1997.
Blaasvaer, et al. "AMOR—An Autonomous Mobile Robot Navigation System", Proceedings of the IEEE International Conference on Systems, Man, and Cybernetics, pp. 2266-2271, 1994.
Hoag, et al. "Navigation and Guidance in interstellar space", ACTA Astronautica vol. 2, pp. 513-533 , Feb. 14, 1975.
Huntsberger et al. "Campout: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.
Iirobotics.com "Samsung Unveils Its Multifunction Robot Vacuum", www.iirobotics.com/webpages/hotstuff.php?ubre=111, 3 pages, Mar. 18, 2005.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", ED Online ID# 13114, 17 pages, Jul. 2006.
Yamamoto et al. "Optical Sensing for Robot Perception and Localization", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium, pp. 1590-1596, May 1998.
Yun, et al. "Image-Based Absolute Positioning System for Mobile Robot Navigation", IAPR International Workshops SSPR, Hong Kong, pp. 261-269, Aug. 17-19, 2006.
Yun, et al. "Robust Positioning a Mobile Robot with Active Beacon Sensors", Lecture Notes in Computer Science, 2006, vol. 4251, pp. 890-897, 2006.
Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.
Zha et al. "Mobile Robot Localization Using Incomplete Maps for Change Detection in a Dynamic Environment", Advanced Intelligent Mechatronics '97. Final Program and Abstacts., IEEE/ASME International Conference, pp. 110, Jun. 16-20, 1997.
Zhang, et al. "A Novel Mobile Robot Localization Based on Vision", SPIE vol. 6279, 6 pages, Jan. 29, 2007.
Euroflex Intellegente Monstre Mauele (English only except), 1998.
Roboking—not just a vacuum cleaner, a robot! Jan. 21, 2004, 5 pages.
SVET Computers—New Technologies—Robot vacuum cleaner, 1 page, 2000.
Popco.net Make your digital life http://www.popco.net/zboard/view.php?id=tr_review no=40 accessed Nov. 1, 2011.
Matsumura Camera Online Shop http://www.rakuten.co.jp/matsucame/587179/711512/ accessed Nov. 1, 2011.
Dyson's Robot Vacuum Cleaner—the DC06, May 2, 2004 http://www.gizmag.com/go/1282/ accessed Nov. 11, 2011.
Electrolux Trilobite, http://www.electrolux-ui.com:8080/2002%5C822%5C833102EN.pdf 10 pages, 2000.
Electrolux Trilobite, Time to enjoy life, 38 pages http://www.robocon.co.kr/trilobite/Presentation_Trilobite_Kor_030104.ppt accessed Dec. 22, 2011.
Facts on the Trilobite http://www.frc.ri.cmu.edu/~hpm/talks/Extras/trilobite.desc.html 2 pages accessed Nov. 1, 2011.

(56) References Cited

OTHER PUBLICATIONS

Euroflex Jan. 1, 2006 http://www.euroflex.tv/novita_dett.php?id=15 1 page accessed Nov. 1, 2011.
FloorBotics, VR-8 Floor Cleaning Robot, Product Description for Manuafacturers, http://www.consensus.com.au/SoftwareAwards/CSAarchive/CSA2004/CSAart04/FloorBot/F, 1997.
Friendly Robotics, 18 pages http://www.robotsandrelax.com/PDFs/RV400Manual.pdf accessed Dec. 22, 2011.
It's eye, 2003 www.hitachi.co.jp/rd/pdf/topics/hitac2003_10.pdf 2 pages.
Hitachi, May 29, 2003 http://www.hitachi.co.jp/New/cnews/hl_030529_hl_030529.pdf 8 pages.
Robot Buying Guide, LG announces the first robotic vacuum cleaner for Korea, Apr. 21, 2003 http://robotbg.com/news/2003/04/22/lg_announces_the_first_robotic_vacu.
CleanMate 365, Intelligent Automatic Vacuum Cleaner, Model No. QQ-1, User Manual www.metapo.com/support/user_manual.pdf 11 pages, 2003.
UBOT, cleaning robot capable of wiping with a wet duster, http://us.aving.net/news/view.php?articleId=23031, 4 pages accessed Nov. 1, 2011.
Taipei Times, Robotic vacuum by Matsuhita about ot undergo testing, Mar. 26, 2002 http://www.taipeitimes.com/News/worldbiz/archives/2002/03/26/0000129338 accessed.
Tech-on! http://techon.nikkeibp.co.jp/members/01db/200203/1006501/, 4 pages, accessed Nov. 1, 2011.
http://ascii.jp/elem/000/000/330/330024/, 1995.
IT media http://www.itmedia.co.jp/news/0111/16/robofesta_m.html accessed Nov. 1, 2011.
Yujin Robotics, an intelligent cleaning robot 'iclebo Q' AVING USA http://us.aving.net/news/view.php?articleId=7257, 8 pages accessed Nov. 4, 2011.
Special Reports, Vacuum Cleaner Robot Operated in Conjunction with 3G Celluar Phone vol. 59, No. 9 (2004) 3 pages http://www.toshiba.co.jp/tech/review/2004/09/59_0.
Toshiba Corporation 2003, http://warp.ndl.go.jp/info:ndljp/pid/258151/www.soumu.go.jp/joho_tsusin/policyreports/chousa/netrobot/pdf/030214_1_33_a.pdf 16 pages.
http://www.karcher.de/versions/intg/assets/video/2_4_robo_en.swf. Accessed Sep. 25, 2009.
McLurkin "The Ants: A community of Microrobots", Paper submitted for requirements of BSEE at MIT, May 12, 1995.
Grumet "Robots Clean House", Popular Mechanics, Nov. 2003.
McLurkin Stupid Robot Tricks: A Behavior-based Distributed Algorithm Library for Programming Swarms of Robots, Paper submitted for requirements of BSEE at MIT, May 2004.
Kurs et al, Wireless Power transfer via Strongly Coupled Magnetic Resonances, Downloaded from www.sciencemag.org , Aug. 17, 2007.
OnRobo "Samsung Unveils Its Multifunction Robot Vacuum", www.onrobo.com/enews/0210/samsung_vacuum.shtml, 3 pages, Mar. 18, 2005.
Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.
Pages et al. "A camera-projector system for robot positioning by visual servoing", Proceedings of the 2006 Conference on Computer Vision and Pattern Recognition Workshop (CVPRW06), 8 pages, Jun. 17-22, 2006.
Pages, et al. "Robust decoupled visual servoing based on structured light", 2005 IEEE/RSJ Int. Conf. on Intelligent Robots and Systems, pp. 2676-2681, 2005.
Park et al. "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun. 27-Jul. 2, 1994.
Park, et al. "Dynamic Visual Servo Control of Robot Manipulators using Neutral Networks", The Korean Institute Telematics and Electronics, vol. 29-B, No. 10, pp. 771-779, Oct. 1992.
Paromtchik "Toward Optical Guidance of Mobile Robots", 1995.
Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).
Penna, et al. "Models for Map Building and Navigation", IEEE Transactions on Systems. Man. And Cybernetics. vol. 23 No. 5, pp. 1276-1301, Sep./Oct. 1993.
Pirjanian "Reliable Reaction", Proceedings of the 1996 IEEE/SICE/RSJ International Conference on Multisensor Fusion and Integration for Intelligent Systems, pp. 158-165, 1996.
Pirjanian "Challenges for Standards for consumer Robotics", IEEE Workshop on Advanced Robotics and its Social impacts, pp. 260-264, Jun. 12-15, 2005.
Pirjanian et al. "Distributed Contol for a Modular, Reconfigurable Cliff Robot", Proceedings of the 2002 IEEE International Conference on Robotics & Automation, Washington, D.C. pp. 4083-4088, May 2002.
Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.
Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.
Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106, Nov. 8-9, 1999.
Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
Prassler et al., "A Short History of Cleaning Robots", Autonomous Robots 9, 211-226, 2000, 16 pages.
Radio Frequency Identification: Tracking ISS Consumables, Author Unknown, 41 pages (NPL0127), 2002.
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001).
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1., Lausanne, Switzerland, pp. 33-36, Sep. 16-19, 1996.
Schenker, et al. "Lightweight rovers for Mars science exploration and sample return", Intelligent Robots and Computer Vision XVI, SPIE Proc. 3208, pp. 24-36, 1997.
Sebastian Thrun, Learning Occupancy Grid Maps With Forward Sensor Models, School of Computer Science, Carnegie Mellon University, pp. 1-28, 2002.
Shimoga et al, "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.

(56) References Cited

OTHER PUBLICATIONS

Sim, et al "Learning Visual Landmarks for Pose Estimation", IEEE International Conference on Robotics and Automation, vol. 3, Detroit, MI, pp. 1972-1978, May 10-15, 1999.
Sobh et al. "Case Studies in Web-Controlled Devices and Remote Manipulation", Automation Congress, 2002 Proceedings of the 5th Biannual World, pp. 435-440, Dec. 10, 2002.
Stella, et al. "Self-Location for Indoor Navigation of Autonomous Vehicles", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.
Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.
The Sharper Image "e-Vac Robotic Vacuum, S1727 Instructions"www.sharperimage.com, 18 pages, 2000.
The Sharper Image "Robotic Vacuum Cleaner—Blue" www.Sharperimage.com, 2 pages, Mar. 18, 2005.
The Sharper Image "E Vac Robotic Vacuum" www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/it.A/id.43/.f, 1 page, Apr. 20, 2005.
TotalVac.com RC3000 RoboCleaner website Mar. 18, 2005.
Trebi-Ollennu et al. "Mars Rover Pair Cooperatively Transporting a Long Payload", Proceedings of the 2002 IEEE International Conference on Robotics & Automation, Washington, D.C. pp. 3136-3141, May 2002.
Tribelhorn et al., "Evaluating the Roomba: A low-cost ubiquitous platform for robotics research and education," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005.
Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.
Watts "Robot, boldly goes where no man can", The Times—pp. 20, Jan. 1985.
Wijk et al. "Triangulation-Based Fusion of Sonar Data with Application in Robot Pose Tracking", IEEE Transactions on Robotics and Automation, vol. 16, No. 6, pp. 740-752, Dec. 2000.
Jarosiewicz et al. "Final Report—Lucid", Unversity of Florida, Departmetn of Electrical and Computer Engineering, EEL 5666—Intelligent Machine Design Laboratory, 50 pages, Aug. 4, 1999.
Jensfelt, et al. "Active Global Localization for a mobile robot using multiple hypothesis tracking", IEEE Transactions on Robots and Automation vol. 17, No. 5, pp. 748-760, Oct. 2001.
Jeong, et al. "An intelligent map-building system for indoor mobile robot using low cost photo sensors", SPIE vol. 6042 6 pages, 2005.
Kahney, "Robot Vacs are in the House," www.wired.com/news/technology/o,1282,59237,00.html, 6 pages, Jun. 18, 2003.

Karcher "Product Manual Download Karch", www.karcher.com, 17 pages, 2004.
Karcher "Karcher RoboCleaner RC 3000", www.robocleaner.de/english/screen3.html, 4 pages, Dec. 12, 2003.
Karcher USA "RC 3000 Robotics cleaner", www.karcher-usa.com, 3 pages, Mar. 18, 2005.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, et al Core Technologies for service Robotics, IEEE/RSJ International Conference on Intelligent Robots and Systems (IROS 2004), vol. 3, pp. 2979-2984, Sep. 28-Oct. 2, 2004.
King "Heplmate—TM—Autonomous mobile Robots Navigation Systems", SPIE vol. 1388 Mobile Robots pp. 190-198, 1990.
Kleinberg, The Localization Problem for Mobile Robots, Laboratory for Computer Science, Massachusetts Institute of Technology, 1994 IEEE, pp. 521-531, 1994.
Knight, et al., "Localization and Identification of Visual Landmarks", Journal of Computing Sciences in Colleges, vol. 16 Issue 4, 2001 pp. 312-313, May 2001.
Kolodko et al. "Experimental System for Real-Time Motion Estimation", Proceedings of the 2003 IEEE/ASME International Conference on Advanced Intelligent Mechatronics (AIM 2003), pp. 981-986, 2003.
Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.
Koolatron "Koolvac—Owner's Manual", 13 pages, 1996.
Krotov, et al. "Digital Sextant", Downloaded from the internet at: http://www.cs.cmu.edu/~epk/, 1 page, 1995.
Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.
Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004.
Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.
Lang et al. "Visual Measurement of Orientation Using Ceiling Features", 1994 IEEE, pp. 552-555, 1994.
Lapin, "Adaptive position estimation for an automated guided vehicle", SPIE vol. 1831 Mobile Robots VII, pp. 82-94, 1992.
LaValle et al. "Robot Motion Planning in a Changing, Partially Predictable Environment", 1994 IEEE International Symposium on Intelligent Control, Columbus, OH, pp. 261-266, Aug. 16-18, 1994.
Lee, et al. "Localization of a Mobile Robot Using the Image of a Moving Object", IEEE Transaction on Industrial Electronics, vol. 50, No. 3 pp. 612-619, Jun. 2003.
Lee, et al. "Development of Indoor Navigation system for Humanoid Robot Using Multi-sensors Integration", ION NTM, San Diego, CA pp. 798-805, Jan. 22-24, 2007.
Leonard, et al. "Mobile Robot Localization by tracking Geometric Beacons", IEEE Transaction on Robotics and Automation, vol. 7, No. 3 pp. 376-382, Jun. 1991.
Li et al. "Robust Statistical Methods for Securing Wireless Localization in Sensor Networks", Wireless Information Network Laboratory, Rutgers University, 2004.
Li et al. "Making a Local Map of Indoor Environments by Swiveling a Camera and a Sonar", Proceedings of the 1999 IEEE/RSJ International Conference on Intelligent Robots and Systems, pp. 954-959, 1999.
Lin, et al.. "Mobile Robot Navigation Using Artificial Landmarks", Journal of robotics System 14(2). pp. 93-106, 1997.

(56) References Cited

OTHER PUBLICATIONS

Linde "Dissertation, "On Aspects of Indoor Localization"" https://eldorado.tu-dortmund.de/handle/2003/22854, University of Dortmund, 138 pages, Aug. 28, 2006.

Lumelsky, et al. "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," 2002, IEeE, p. 2359-2364.

Ma "Thesis: Documentation on Northstar", California Institute of Technology, 14 pages, May 17, 2006.

Madsen, et al. "Optimal landmark selection for triangulation of robot position", Journal of Robtics and Autonomous Systems vol. 13 pp. 277-292, 1998.

Martishevcky, "The Accuracy of point light target coordinate determination by dissectoral tracking system", SPIE vol. 2591 pp. 25-30, 2000.

Matsutek Enterprises Co. Ltd "Automatic Rechargeable Vacuum Cleaner", http://matsutek.manufacturer.globalsources.com/si/6008801427181/pdtl/Home-vacuum/10 . . . , Apr. 23, 2007.

McGillem, et al. "Infra-red Lacation System for Navigation and Autonomous Vehicles", 1988 IEEE International Conference on Robotics and Automation, vol. 2, pp. 1236-1238, Apr. 24-29, 1988.

McGillem,et al. "A Beacon Navigation Method for Autonomous Vehicles", IEEE Transactions on Vehicular Technology, vol. 38, No. 3, pp. 132-139, Aug. 1989.

Michelson "Autonomous Navigation", 2000 Yearbook of Science & Technology, McGraw-Hill, New York, ISBN 0-07-052771-7, pp. 28-30, 1999.

Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.

Monteiro, et al. "Visual Servoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.

Moore, et al. A simple Map-bases Localization strategy using range measurements, SPIE vol. 5804 pp. 612-620, 2005.

Munich et al. "SIFT-ing Through Features with ViPR", IEEE Robotics & Automation Magazine, pp. 72-77, Sep. 2006.

Munich et al. "ERSP: A Software Platform and Architecture for the Service Robotics Industry", Intelligent Robots and Systems, 2005. (IROS 2005), pp. 460-467, Aug. 2-6, 2005.

Nam, et al. "Real-Time Dynamic Visual Tracking Using PSD Sensors and extended Trapezoidal Motion Planning", Applied Intelligence 10, pp. 53-70, 1999.

Nitu et al. "Optomechatronic System for Position Detection of a Mobile Mini-Robot", IEEE Ttransactions on Indusrial Electronics, vol. 52, No. 4, pp. 969-973, Aug. 2005.

On Robo "Robot Reviews Samsung Robot Vacuum (VC-RP30W)", www.onrobo.com/reviews/AT_Home/vacuum_cleaners/on00vcrb30rosam/index.htm.. 2 pages, 2005.

InMach "Intelligent Machines", www.inmach.de/inside.html, 1 page , Nov. 19, 2008.

Innovation First "2004 EDU Robot Controller Reference Guide", http://www.ifirobotics.com, 13 pgs., Mar. 1, 2004.

\* cited by examiner

REMOTE CONTROL SCHEDULER AND METHOD FOR AUTONOMOUS ROBOTIC DEVICE

CROSS-REFERENCE TO RELATED APPLICATIONS

This application claims priority to and the benefit of U.S. provisional patent application Ser. No. 60/582,531, filed Jun. 24, 2004, the disclosure of which is being incorporated herein by reference in its entirety. This application is related to U.S. patent application Ser. No. 11/166,518, filed Jun. 24, 2008, entitled "Programming and Diagnostic Tool for a Mobile Robot," the disclosure of which is being incorporated herein by reference in its entirety.

FIELD OF THE INVENTION

The present invention relates generally to the field of robotics including the control of an autonomous robotic device and, more particularly, to a remote control device and associated method for inputting schedule information via IR signals to an autonomous robotic device, such as a cleaning robot.

BACKGROUND OF THE INVENTION

Robotic cleaning devices can be used to clean a defined area based on a program stored in the robot's processor. The purpose of these devices is to clean efficiently a room without the need for a user to physically control the cleaning device, or even be in the room when the floor is being cleaned. This can effectively reduce the time necessary for household chores, reduce noise pollution by enabling a room to be cleaned without the need for a user to be present, or enable an elderly or disabled person to clean a room which would otherwise be difficult or impossible to achieve without aid.

A number of methods for achieving this aim are currently in use. For example robotic cleaning devices are available which allow the movement of the robot to be controlled directly by a remote communication device to either follow a path defined by commands from the remote device, or to follow a cleaning path based on a program stored in the robot. These devices however require a user to be present in order to control the motion of the robot or directly implement a stored cleaning mission.

Devices are available which allow a robotic cleaner to be controlled remotely from a separate electronic device, such as a PC with a wireless communication attachment. These devices can therefore be controlled from a scheduling and control application program within the computer, thus allowing the device to operate without the need for a user to be present. These devices require a separate PC to be operational and in linked communication with the robotic device before it can carry out a task and complete a scheduling assignment.

Robotic cleaners are also available which allow a user to directly input scheduling and control information into the robotic device using buttons located on the device itself. As a result, this device can work autonomously once a schedule has been physically input into the robotic device. However, this device does not allow scheduling information to be communicated to the device from a remote controller. As a result, the device would not completely alleviate the need to physically approach the controller, bend down, and input the scheduling information manually. This could limit the ability of the device to be easily used by a person of limited mobility.

None of the current robotic cleaners allow all the desired functions of a robotic cleaning robot to be enabled from a single remote device, without the need for further external control. The devices currently available require either an external source to control the scheduling function, or a direct physical input of the scheduling information through user inputs on the robotic device itself. Allowing a robotic cleaner to run autonomously a scheduling application without external input, receive updated scheduling and other user applications or information from a portable remote device without direct physical contact, and also allow the robotic cleaner to be directly controlled remotely from the same portable remote device, if and when required, would greatly increase the utility of the robotic cleaner and broaden the range of applications for a user.

From the foregoing, there is a need for a method and apparatus to allow a robotic cleaning device to operate autonomously to a remotely communicated user defined schedule, without the need for a user to be present or for a further control input from an external source. It is also desirable to provide a single portable apparatus that can load the configuration applications into the robotic device, select and communicate scheduling information to the robotic device, and control a function of a robotic device based on a direct user command, to improve the utility, efficiency and usability of a robotic cleaning device.

SUMMARY OF THE INVENTION

The invention provides a method and apparatus for configuring a robotic device to operate according to a user defined schedule. Upon configuration of the robotic device, the method and apparatus allows a user to input scheduling information into the robotic device using a remote communication device, after which the robotic device is capable of operating without any further input from a user or the remote device. The communication device can also be used to control directly a function of the robotic device, or to receive information from the robotic device. One or more implementations of the invention may provide one or more of the following features.

In one embodiment of the invention, a configuration tool can be used to configure a robotic device. This method includes the steps of linking the configuration tool to the robotic device, authenticating the configuration tool, and loading, via the configuration tool, information into the robotic device after successful authentication of the configuration tool. The information loaded into the robotic device can include a scheduling application program to enable a scheduling capability of the device. The loading step also allows the communication device to retrofit, reprogram, and upgrade the scheduling capability of the robotic device at any time.

In one configuration of the invention, the link connecting the configuration tool to the robotic device can include a communication port in each device, such as but not limited to a serial port, USB port, or other appropriate communication port. The robotic device and the configuration tool can then communicate through a cable plugged into the communication port of each device. In an alternative configuration, the link between the configuration tool and the robotic device can be a direct physical connection, wherein one device includes a male serial port adapter, or other communication port adapter such as a USB connector, which plugs directly into a female port on the other device. In a further alternative configuration, the robotic device and configuration tool may link through a wireless connection, wherein a remote signal, such as an infrared, radio frequency, or other appropriate frequency signal, is used to load information from the configuration tool to the robotic device.

The scheduling application program loaded into the robotic device can enable the robotic device to implement further scheduling information from a remote device. As a result, the robotic device can be enabled to run autonomously based on scheduling information loaded into, and stored in, the robotic device without further user input. One embodiment of the invention allows the remote device to be a hand-held input device that can communicate with the robotic device through a wireless connection.

One embodiment of the invention includes a method for configuring a robotic device for autonomous use, including the steps of selecting scheduling information in a remote device, linking the remote device to the robotic device, authenticating the link, communicating the scheduling information from the remote device to the robotic device, and storing the scheduling information in the robotic device. The link between the robotic device and the remote device can be a wireless connection, or any other linking method, such as those described above.

Once the scheduling information has been stored in the robotic device, it can operate in accordance with this stored scheduling information. As a result, the stored scheduling information enables the robotic device to run autonomously without further user input. In one embodiment, the stored scheduling information can include the date, day, and/or time at which the robotic device should operate, and also the number and type of mission it should run at each scheduled time.

Another embodiment of the invention includes a method of communicating with a robotic device. This method includes the steps of linking a single communication device to the robotic device, authenticating the link, and transmitting information from the communication device to the robotic device, wherein the transmitted information includes controlling a function of the robotic device, and at least one of configuring the robotic device and providing scheduling information for the robotic device. As a result, a single communication device can provide multiple functions for the control, scheduling, and configuration of a robotic device.

In various embodiments of the invention the transmitted information can include control and scheduling information, control and configuration information, or control, configuration and scheduling information. This control, configuration, and scheduling information need not be transmitted at the same time, but can be communicated independently, and at different times to enable one specific aspect of the invention. The communication device used to transmit this information can include, but is not limited to, a hand-held remote device, a PC, a laptop, and a wireless communication device.

In one embodiment of the invention, the method can further include the step of transmitting information from the robotic device to the communication device. This information transmitted from the robotic device can include, but is not limited to, an error report, a power level report, currently stored scheduling information, a status report, authentication information, and a user maintenance report.

One embodiment of the invention provides an apparatus for communicating with a robotic device. This apparatus includes a memory for storing information, at least one port for communicating with the robotic device, at least one authenticator for authenticating the robotic device, and at least one transmitter for transmitting information to the robotic device, via a communication port. The information communicated to the robotic device includes information for controlling a function of the robotic device, and at least one of configuration information and scheduling information for the robotic device. In an alternative embodiment, the apparatus can also receive information transmitted from the robotic device.

The apparatus can be a hand-held remote device, or other communication device, and can further include a wireless communication device. In one embodiment, the apparatus can include a display, allowing a user to view information associated with the running of the apparatus. The apparatus can also include at least one user input, allowing the user, for example, to input information to be communicated to the robotic device, directly control a function of the robotic device through a wireless connection, upload information from the robotic device, or search for or control a function of the remote device itself. In various embodiments of the apparatus, the user input can include, but is not limited to, a switch, a joystick, a button, a touch sensitive pad, a roller-ball, and an acoustic input, such as a voice command.

In another embodiment, the invention can include a robotic device that includes a memory for storing information, at least one port for receiving information from a communication device, and at least one authenticator for authenticating the communication device. The communicated information includes information for controlling a function of the robotic device, and at least one of configuration information and scheduling information for the robotic device. This control, configuration, and scheduling information need not be received at the same time, but can be received independently, and at different times, to enable one specific aspect of the invention.

The robotic device is adapted to operate autonomously without further user input based upon scheduling information received from the communication device. Thus, upon loading of a scheduling application program, either pre-installed or by a communication device, a user can enable the robotic device to run autonomously according to the received scheduling information. The robotic device can consist of either a mobile robotic device, such as a cleaning robot, or a stationary robotic device. In one embodiment it can also include at least one transmitter for transmitting information to the communication device.

In yet another aspect, the invention can consist of a robotic system including both a robotic device and a separate communication device for communicating information with the robotic device. The communicated information consists of information for controlling a function of the robotic device, and at least one of configuration information and scheduling information for the robotic device. In one embodiment of the invention, the robotic device can also transmit information to the communication device. In one embodiment, the communication device can be a hand-held remote device, while the robotic device can be either a mobile robotic device or a stationary robotic device.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The invention provides a method and apparatus for configuring a robotic device to run autonomously according to stored scheduling information. The apparatus includes a communication device that can be used to directly control a function of the robotic device. For example, the communication device can be used to provide directional control to a mobile robotic device such as a cleaning robot. The communication device can also be used to load configuration information, such as a scheduling application program, into the robotic device, such that the robotic device can run autonomously without further user input upon storing user define scheduling information. This scheduling information can also be communicated to the robotic device via the communication device.

Figure 1:
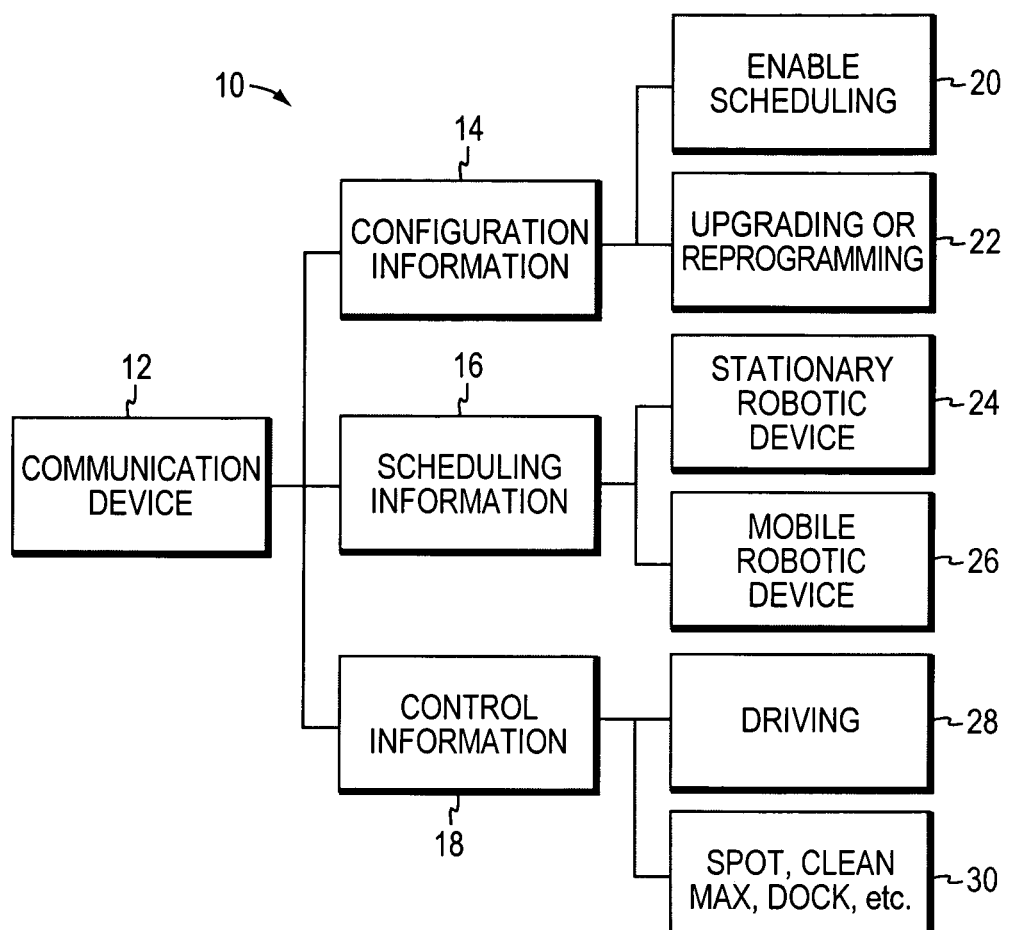
FIG. 1 is a block diagram showing one configuration of the communication device and robotic device system, in accordance with one embodiment of the invention.

FIG. 1 is a block diagram showing one possible configuration of a combined scheduling tool and communication device 10. In this configuration, a single communication device 12 is adapted and configured to carry out multiple tasks related to the scheduling and control of a robotic device. Firstly, the communication device 12 can be linked with a robotic device in order to download configuration information 14 into the robotic device. This configuration information 14 may include a new application program to enable the robotic device to carry out new tasks, or be adapted to enhance the tasks it can already perform. For example, the configuration information 14 can include a scheduling application program 20, to enable the robotic device to carry out a set task at a set time. The task to be performed and time at which it is to be performed can be downloaded with the application program or communicated at a later date through the communication device 12, based on the requirements of the user. The application can also configure the robotic device to receive signals remotely from the communication device 12 in order to enable user defined scheduling.

In one embodiment of the device, this configuration information 14 can be sent through a wireless connection with the robotic device, with the information sent by infrared (IR), radio frequency (RF), or other appropriate signal. In alternative embodiments, the scheduling information could be sent through communication ports linked by a cable (for example a USB or serial port link), or even by a direct physical connection between the communication device 12 and the robotic device. For a direct communication, a male connector (e.g. USB, serial port or other appropriate connection element) on one device mates directly with a female connector on the other device. In further alternative embodiments, the direct communication can include a docking station on the robotic device, such that the communication device can be removeably attached to the robotic device, thus allowing the communication device to act as a direct user interface between a user and the robotic device.

The configuration information 12 can also include information 22 for upgrading the existing capabilities of the robotic device or reprogramming the device to carry out new tasks. This upgrading information 22 can include, but is not limited to, new versions of the software installed in the robotic device, diagnostic information to check the status of the robotic device, and programs to allow the robotic device to send information to the communication device (either prompted by the user or upon the occurrence of a certain event). Further upgrading or reprogramming information 22 can include programs and applications allowing the robotic device to carry out completely new tasks (such as, but not limited to, working as a toy, security device, or searching device for lost objects) or "learning" programs and applications allowing the robotic device to adapt its own programming based on information gained through carrying out specified tasks. These learning programs can, for example, allow a mobile robotic device 26 to map out a room and remember where the objects in the room are placed, or adapt its scheduling based on prior patterns of user behavior.

The communication device 12 can also be configured to communicate scheduling information 16 to a robotic device. In one embodiment, this scheduling information 16 is sent through a wireless connection between the communication device 12 and the robotic device, although again in alternative embodiments, communication ports providing a wired link (such as a USB or serial port link), or a direct physical connection can be used. The scheduling information can be communicated to both a stationary robotic device 24, or a mobile robotic device 26. The mobile robotic device 26 can, for example, be a cleaning robot such as the Roomba® brand floor vacuum sweeper available from iRobot Corporation, Burlington, Mass. The stationary robotic device 24 can, for example, be a portable barrier signal transmitter designed to send an IR beam along a designated path. The mobile robotic device 26 can be configured to change direction upon encountering this signal, thus the IR beam from the portable barrier signal transmitter acts as a "virtual wall" for the mobile robotic device (see U.S. Pat. No. 6,690,134, incorporated herein by reference in its entirety). The stationary robotic device 24 can also be a docking station, home-base, or charging device for the robotic device.

In one embodiment of the invention, scheduling information 16 can be input into the communication device 12 through a user interface of the device 12. This information can then be communicated to a stationary 24 or mobile 26 robotic device through a wireless connection between the communication device 12 and the robotic device. The robotic device stores this information and runs according to the stored scheduling information 16 without the need for any other input from a user, controller or communication device 12. Changes in the scheduling information 16 stored in the robotic device can be made by simply inputting new scheduling information 16 into the communication device 12 and communicating it to the robotic device. In an alternative embodiment, a further step, such as but not limited to clearing the stored scheduling information 16 from the robotic device's memory or inputting a code (either into the communication device 12 or directly into the robotic device), may be required before new scheduling information 16 can be loaded into the robotic device.

In one embodiment of the invention, the robotic device can be configured to provide a visual or audio signal upon the completion of a transfer of configuration or scheduling information. In an alternative embodiment, a return signal can be sent from the robotic device to the communication device 12 upon the successful completion of an information transfer. The robotic device can also be configured to illuminate a status light on either device if and when a scheduling program is stored in the memory.

The scheduling information 16 can include, but not be limited to, the date, day and time at which the robotic device operates, and may also include other information such as the length of time the robotic device should operate during a scheduled event, the mission or task it should carry out for each scheduled operation, and the number of missions or tasks it should carry out during a scheduled operation. The scheduling information can also include more complex calendar based information, such that the robotic device may be able to adjust its start time based on the time of year (for example due to time differences for daylight savings time or for the available hours of daylight), or adjust its schedule for holidays.

A robotic device can be configured or programmed to run a number of separate programs. For example, a mobile cleaning robot can be configured to clean different areas of a room or building, clean a particular spot on a floor, clean at varying power levels between a minimum to a maximum setting, return to a docking station when power drops to a specific level or the dirt compartment is full, or carry out other specific tasks. Using the scheduling information 16, the missions or tasks that the robotic device carries out can then be tailored to a user's requirements, for example by only carrying out a high power cleaning mission at times when nobody is in the house. In one embodiment of the invention, a stationary robotic device 24, such as a portable barrier signal transmitter, can be scheduled to operate at the same time as a mobile cleaning robot, thus saving power. Alternatively, the stationary robotic device 24 may only turn on during some scheduled operations depending on whether a user want to clean the area potentially blocked by the portable barrier signal transmitter or not.

In one embodiment, the communication device 12 can also be used to provide direct control information 18 to a robotic device, based on a user input. This can involve directly driving a function of a robotic device 28, or initiating the robotic device to carry out a preprogrammed mission or task 30. In one embodiment of the invention, the communication device 12 includes a user input, or a number of inputs, such as, but not limited to, switches, a joystick, buttons, a touch sensitive pad, and a roller-ball. Using one of, or a combination of, these user inputs, a user can command the robot to carry out a specific movement or action immediately. For example, the driving information 28 may include, but not be limited to, commands to make a moveable robotic device turn left, turn right, move forward, and move backward. In the specific embodiment of a mobile cleaning robot, the driving information 28 may also include such commands as start and stop cleaning, or clean at a specific power level.

The driving information 28 may also include commands to carry out pre-programmed missions, tasks or actions. For example, the communication device 12 can include buttons or other user inputs that command a robotic device to specific task when the user input is enabled. For a mobile cleaning robot, these task commands 30 could include cleaning a specific spot, carrying out a specified cleaning mission, cleaning at a specific power level, stop and power down, power up, or return to a docking station.

Figure 2A:
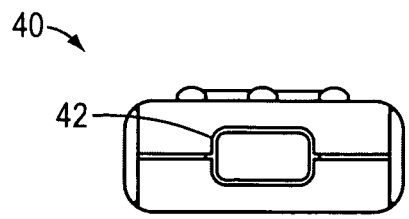
FIG. 2A is a schematic front-end view of the communication device and/or configuration tool, in accordance with one embodiment of the invention.

FIGS. 2A-2E show five views of an example of a particular communication device 40. FIG. 2A shows a front-end view of the communication device 40, showing a wireless communication port 42, allowing the communication device 40 to communicate remotely, using for example IR signals, with a robotic device or other electronic device. The wireless communication port 42 can be used to provide configuration, scheduling, and control information to a robotic device, and optionally also receive information from a robotic or other device.

In one embodiment of the invention, the communication device can be configured to receive a range of information from a robotic device. In the case of a robotic cleaning device, this information can include, but not be limited to, receiving power level or dirt compartment level status reports, error reports, information on when filters, sensors or brushes need to be cleaned, "dirt alerts" when a dirty area of floor is detected, or mission status reports (e.g. mission completed/abandoned/battery depleted, etc.)

Figure 2C:
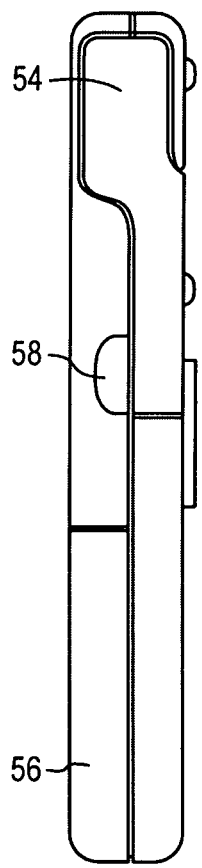
FIG. 2C is a schematic left-side view of the communication device of FIG. 2A.
Figure 2B:
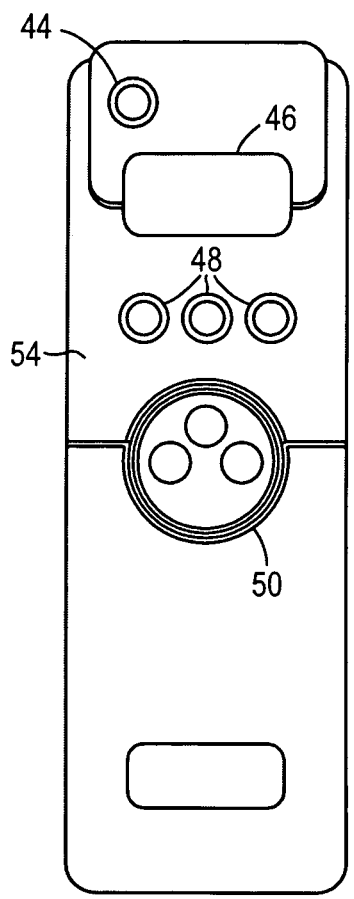
FIG. 2B is a schematic top view of the communication device of FIG. 2A.

FIG. 2B shows a top or plan view of the communication device 40. The communication device 40 includes a number of user input devices, including a button 44, a set of buttons 48, and a second set of buttons 50. Each of these buttons (i.e., switches) can be configured to input different information into the communication device 40, or provide different information to a robotic device. In one embodiment of the invention, the function of these buttons can differ when a front cover or flip lid 54 is in either an open or closed position. In this embodiment, with the front cover 54 open, the buttons can be used to input and store scheduling or other information into the communication device 40, while with the lid 54 closed the buttons can be used to communicate with a robotic device and provide configuration, scheduling, and control information to the robotic device.

In one embodiment, button 44 could be used to initiate the communication of configuration or scheduling information to a robotic device, control a specific task of the robotic device (such as initiating docking), or turn the robotic device, or the communication device 40, on and off. Buttons 48 can be used to provide input information into the communication device 40 when setting up scheduling information, enable the loading of specific configuration information into a robotic device, or control a specific mission, task or action of the robotic device. Buttons 50 may be used to input scheduling information into the communication device 40, enable the loading of configuration or scheduling information into a robotic device, and control a specific action of the robotic device. In one embodiment of the invention the buttons 50 could be used to control directly the movement of a cleaning robot, with the three buttons assigned to turning left, turning right, and moving forward. In an alternative embodiment, one or other of the buttons can also be used to lock the robotic device in a certain mode of operation, or in an "off" setting.

The communication device shown in FIG. 2B also includes a display 46. This display 46 can for example be a liquid crystal display (LCD), allowing the user to see the information being inputted into the communication device 40, showing which configuration information, scheduling information or control information a robotic device is being sent, or for showing information sent from the robotic device to the communication device 40.

FIG. 2C shows a left-side view of the communication device 40. This view shows the side of the flip lid 54 when the lid is closed. This front cover 54 can be used to, but not limited to, change the functions of the user inputs, show or hide portions of the display 46, uncover other hidden user inputs, or uncover instructions for the use of the device. Indentations 58 below the edge of the front cover 54 are included to allow for easy opening of the cover 54 by a user. The casing 56 or the communication device 40 can be made of either metal or plastic, and can include a removable cover to allow access to a battery compartment (not shown).

Figure 2D:
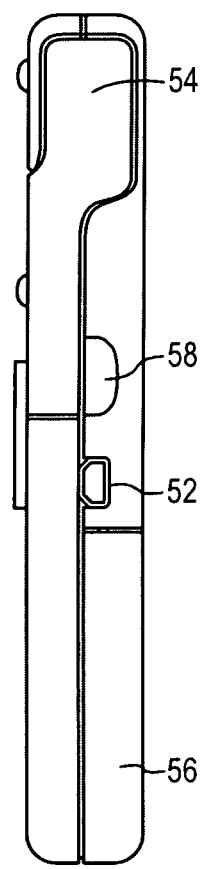
FIG. 2D is a schematic right-side view of the communication device of FIG. 2A.
Figure 2E:
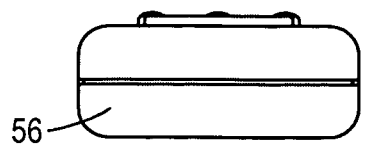
FIG. 2E is a schematic rear-end view of the communication device of FIG. 2A.

FIG. 2D shows a right-side view of the communication device 40. This view includes a communication port 52 to allow the communication device 40 to connect to another device for uploading and downloading information, such as, but not limited to, authenticating information, configuration information, scheduling information, control information, and technical information. The communication port 52 can be, but is not limited to, a serial port, a parallel port, a USB port, an IEEE 1394 "Firewire" port, a PS/2 port, a modem port, or an Ethernet network port.

FIG. 2D shows a rear-end view of the communication device 40. In one embodiment of the invention, the communication device 40 of FIGS. 2A-2E is sized and shaped to fit in a users hand, and can be used in the same manner as a television or video remote control. In an alternative embodiment of the invention, other user input devices can be used as a communication device 40 to communicate with a robotic device. Such alternative devices include, but are not limited to, another hand-held remote device, a stationary remote communication device with user interface, a PC, a laptop computer, and a wireless communication device, such as a mobile phone or personal digital assistant (PDA).

Figure 3:
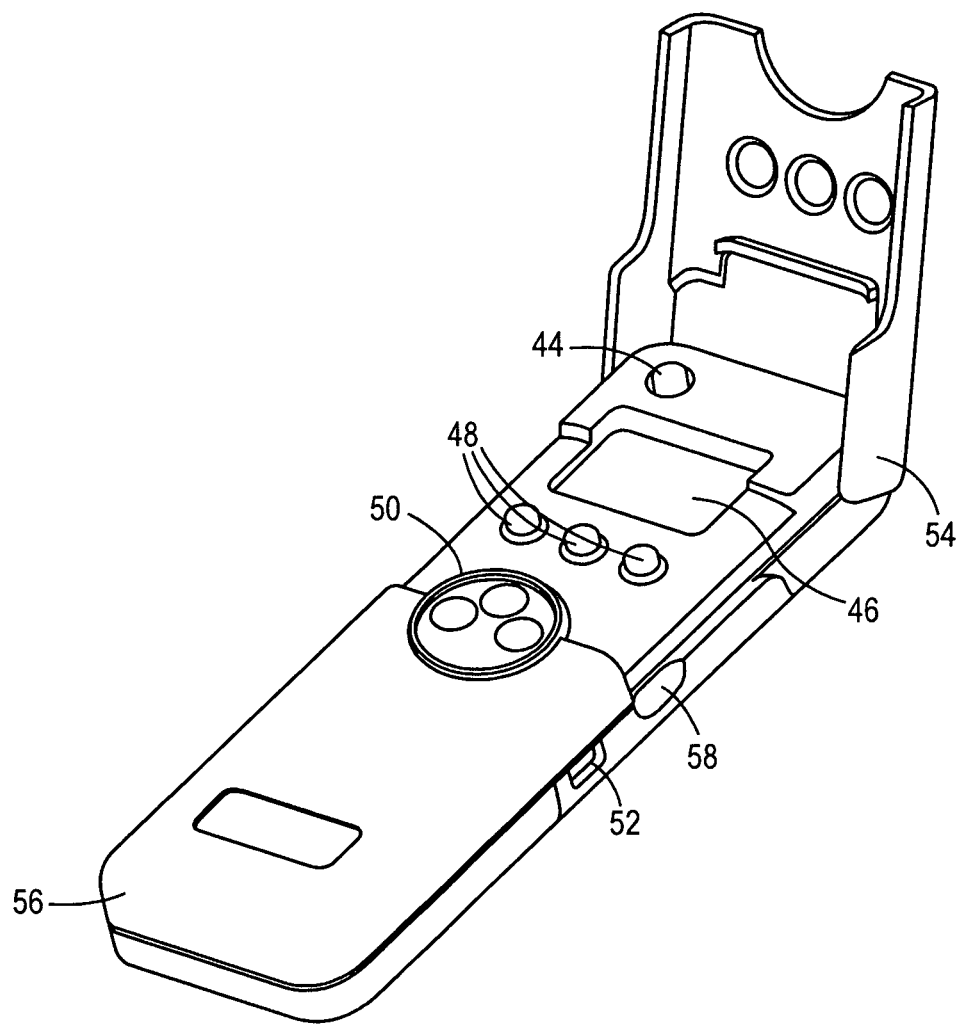
FIG. 3 is a schematic perspective view of the communication device and/or configuration tool with an open front cover, in accordance with one embodiment of the invention.

FIG. 3 is a schematic view of the communication device 40 of FIGS. 2A-2E with an open front cover 54. As previously discussed, the opening of the front cover 54 can be used to, amongst other things, uncover hidden user inputs, change the function of certain user inputs, uncover a portion of the display 46, enable certain "locked" functions of the communication device 40, or uncover instructions printed on the inside of the cover 54.

Figure 4:
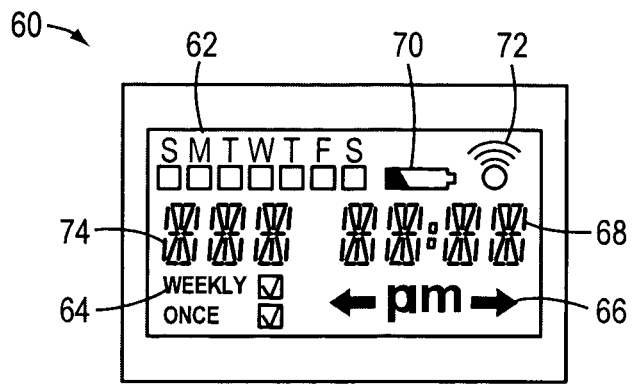
FIG. 4 is a schematic display for a communication device and/or configuration tool, in accordance with one embodiment of the invention.

FIG. 4 is a image of an example display 60 for a communication device. This display 60 includes a day of the week indicator 62, a schedule frequency indicator 64, indicating whether a specific scheduling task is to be performed once or repeatedly on a weekly basis, and time indicators showing whether a scheduled task is to be performed in the "am" or "pm" 66, and at what specific time 68. The display 60 also includes a power indicator 70 and a signal indicator 72 that can indicate when a signal is being communicated from or to the communication device. A further indicator 74 can be used to display additional information, such as, but not limited to, the number of the scheduled task, the type of task to be performed, and the status of a device.

In alternative embodiments of the invention, the display 60 could also be configured to show things as options for the type of configuration information that can be communicated, the range and type of scheduling information available for a given robotic device, and previously transmitted scheduling information. A display 60 can also be configured to show information received from a robotic device, as discussed above.

Figure 5:
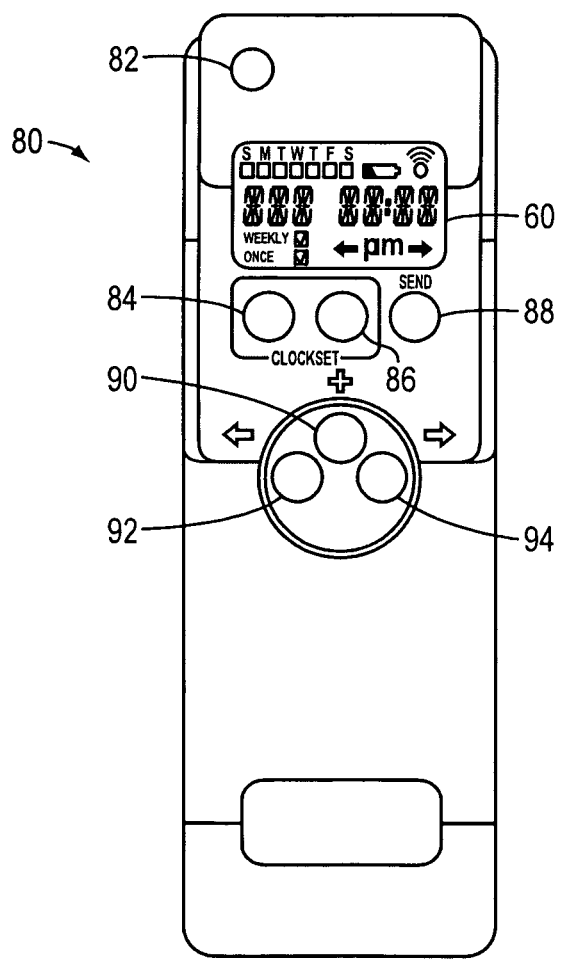
FIG. 5 is a schematic top view of a communication device and/or configuration tool with the display of FIG. 4, in accordance with one embodiment of the invention.

FIG. 5 shows an image of a communication device 80 with the display 60, in accordance with one embodiment of the invention. This configuration conforms generally with the communication device 40 shown in FIGS. 2A-2E and FIG. 3, with the user inputs assigned specific tasks. In this configuration, button 82 is an on/off switch, button 84 enables a new scheduling program or saves an inputted scheduling program, button 86 deletes inputted information, and button 88 enables the communication device 80 to send scheduling information to a robotic device. Further user inputs are configured to provide direct control commands to a mobile robotic device, with button 90 providing a "move forward" command, button 92 providing a "turn left" command, and button 94 providing a "turn right" command to the robotic device. The display 60 unit embedded in the communication device 80 conforms generally with that of FIG. 4.

Figure 6A:
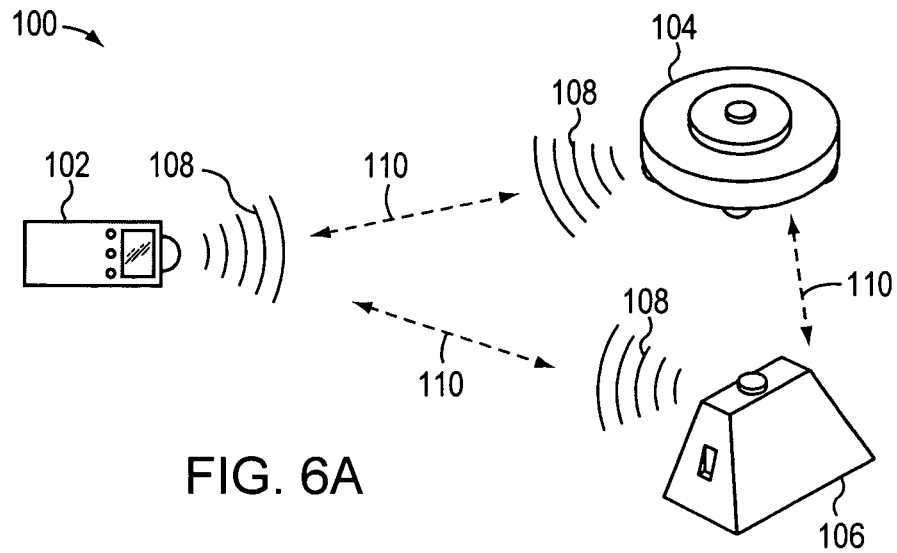
FIG. 6A is a schematic diagram illustrating a communication device in wireless communication with mobile and stationary robotic devices, in accordance with one embodiment of the invention.
Figure 6B:
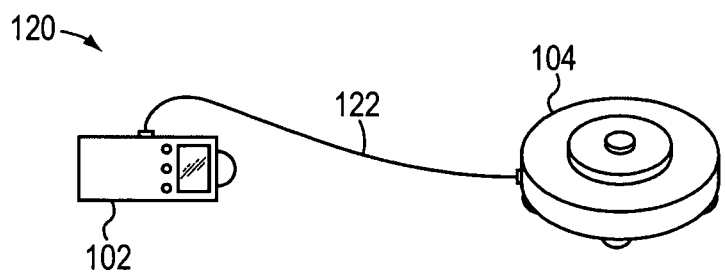
FIG. 6B is a schematic diagram illustrating a communication device in communication, through a communication port and cable, with a mobile robotic device, in accordance with one embodiment of the invention.
Figure 6C:
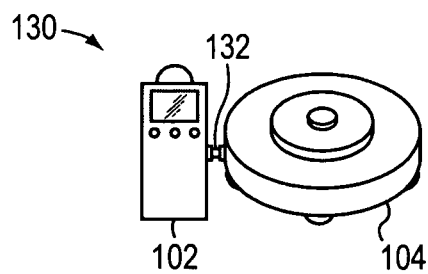
FIG. 6C is a schematic diagram illustrating a communication device in direct physical communication with a mobile robotic device, in accordance with one embodiment of the invention.

FIGS. 6A-6C show various means of linking a communication device with a stationary or mobile robotic device. In the system configuration 100 shown in FIG. 6A, a communication device 102 is configured to communicate through a wireless connection with either or both of a mobile robotic device 104 and a stationary robotic device 106. In one embodiment, the wireless link consists of an IR signal 108, which can be sent from the communication device 102 to the mobile 104 and stationary 106 robotic devices. In this configuration, further IR signals 108 can be sent from the robotic devices to the communication device 102, as indicated by the arrows 110. In this system, configuration, scheduling, and control information can be communicated from the communication device 102 to the mobile 104 and stationary 106 robotic devices, while information such as, but not limited to, status reports and error reports can be communicated back to the communication device 102 from the robotic devices. In alternative embodiments, the communication device 102 can communicate information to a single mobile 104 or stationary 106 robotic device, that can then send the communicated information to further devices directly, without the need for additional linking to the communication device 102. In this configuration, multiple mobile 104 or stationary 106 robotic devices can be configured, scheduled, and/or controlled through a link with only a single robotic device.

In the system configuration 120 shown in FIG. 6B, a mobile robotic device 104 is linked to a communication device 102 through a cable 122. The cable connects both devices through communication ports located on each device. These ports can be a serial port, parallel ports, USB ports, IEEE 1394 "Firewire" ports, PS/2 ports, modem ports, Ethernet network ports, or other appropriate communication ports. In one embodiment of this system configuration 120, the cable connection 122 can be used to quickly load configuration information into a mobile robotic device 104. This system configuration 120 can also be used to load configuration information into a stationary robotic device 106. This configuration information can be used to either enable a new scheduling function on the robotic device, or upgrade or reprogram existing functions of the robotic device, as discussed above. After the configuration information has been loaded through the cable 122, the cable 122 can be removed. Further scheduling information and control information can then be communicated to the robotic device using a wireless connection, as shown in system configuration 100 and FIG. 6A.

In the system configuration 130 shown in FIG. 6C, a mobile robotic device 104 is linked to a communication device 102 through a direct connection 132. This direct connection can consist of a male connection port on the communication device 102, that mates directly to a female connection port on the mobile robotic device 104. Again, this system configuration 130 can also be used to link the communication device 102 to a stationary robotic device 106. As in system configuration 120, shown in FIG. 6B, this system configuration can be used to load configuration information into a robotic device, after which scheduling or control information can be communicated to the robotic device through the wireless communication configuration 100 shown in FIG. 6A. In one embodiment of the invention, the male connection port on the communication device 102 can retract or fold into the communication device 102 when not in use.

Figure 7:
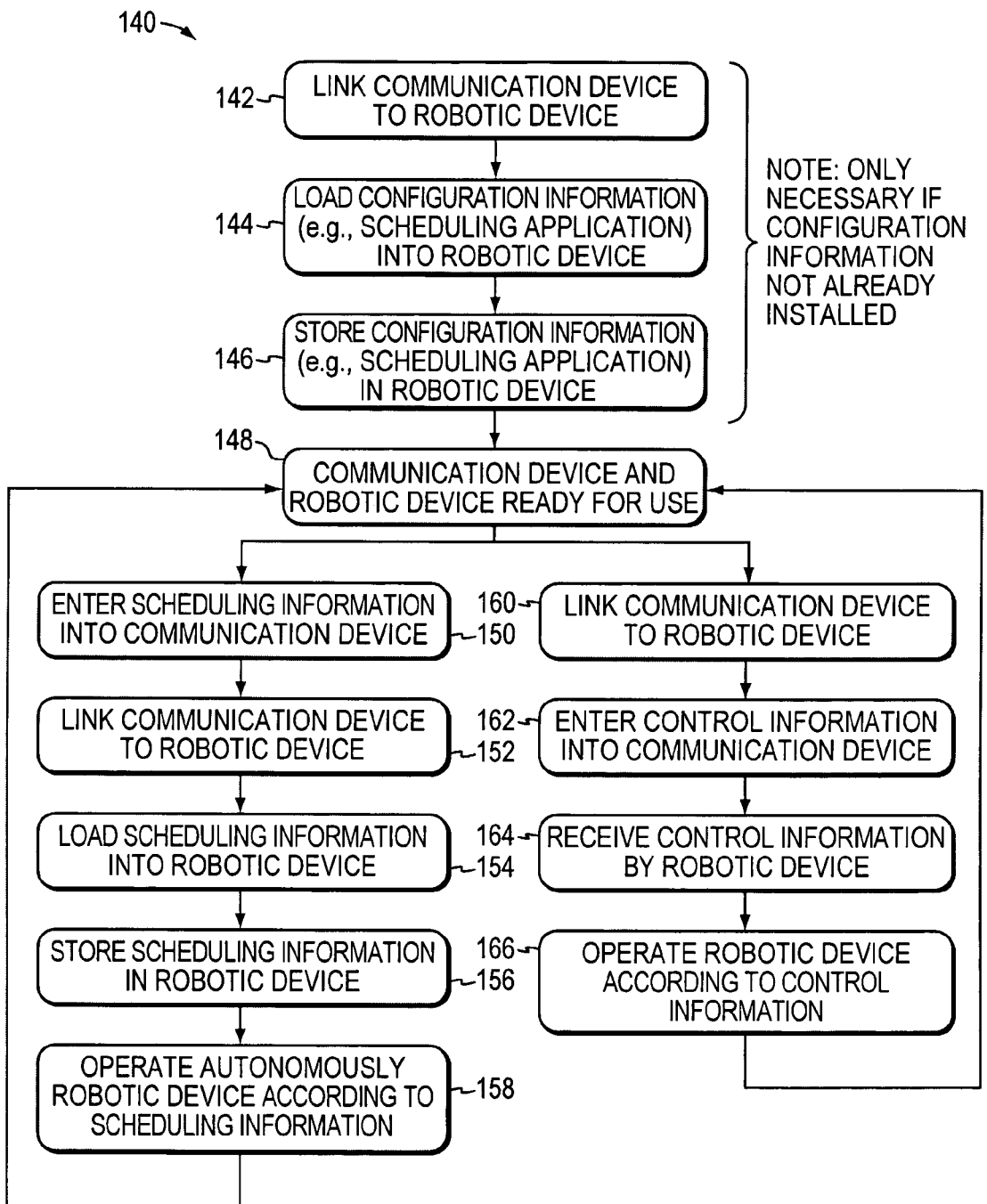
FIG. 7 is a block diagram featuring a method for implementing and using a system including a robotic device and a communication device, in accordance with one embodiment of the invention.

FIG. 7 shows a block diagram featuring one method 140 for implementing and using a system including a robotic device and a communication device. In this method 140, a single communication device can be used to provide configuring, scheduling, and control information to a robotic device.

For a robotic device without a pre-installed scheduling application program, or a robotic device needing reprogramming or upgrading, the communication device can be used to load the required configuration information into the robotic device. This requires first linking 142 the communication device to the robotic device, either through a wireless connection, communication port, or direct connection. Upon optional authentication of the link using an authenticator (e.g., by hardware or software based systems), the desired configuration information can be loaded 144 into the robotic device, at which time it is stored 146 in memory of the robotic device. After this has been completed, the robotic device is ready for use 148. For robotic devices that have already been configured, steps 142, 144, and 146 are not necessary.

Once the robotic device and communication device are ready for use 148, the communication device can be used to provide scheduling information or direct control information to the robotic device. In one embodiment, this information is communicated through a wireless link, although a communication port link or direct link is also possible.

For enabling the robotic device to run according to a user defined schedule, the scheduling information is first entered into the communication device 150. The communication device can then be linked 152 to the robotic device and, upon optional authentication of this link, the scheduling information can be loaded 154 into the robotic device and stored 156 in the device's memory. The robotic device is then free to run autonomously 158, based on this stored scheduling information. Depending on the schedule, the robotic device can start immediately or at a future time.

As well as providing scheduling information to a robotic device, the communication device can also directly control one or more function of the robotic device. Again, with the communication device and robotic device ready for use 148, a link can be formed 160 between the communication device and robotic device. Once the link has been authenticated, control information entered 162 into the communication device is received 164 immediately by the robotic device, which then operates 166 according to the user inputted control information.

The scheduling and control functions can run independently, such that the robotic device can be controlled by the user even when the robotic device is not scheduled to run, and alternatively run a scheduled mission without any need for control information. In one embodiment of the invention, the control function can be configured to overrule the scheduling function, so that during a scheduled event a user can take direct control of the robotic device without waiting until the scheduled task is completed. In an alternative embodiment, the scheduling function can be set as the dominant function, and thus upon the start of a scheduled task overrule any direct user control information being communicated at that time.

It should be noted that these functions can at any time be modified or updated by downloading new configuration information into the robotic device. In one embodiment of the invention the communication device can also be configured, updated or reprogrammed by linking the communication device to another device, such as but not limited to a PC, laptop, or other programming or diagnostic tool. As a result, both the communication device and the robotic device can be constantly updated to meet the requirements of the user and advancements developed by the system manufacturers or suppliers.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:
1. A robotic system comprising:
a mobile robotic device comprising a processor;
a stationary charging device to which the robotic device returns; and
a hand-held remote device separate from the mobile robotic device, the hand-held remote device comprising:
  a start button configured to provide a wireless remote signal directing the mobile robotic device to immediately start an autonomous mission by leaving the stationary recharging device;
  a dock button configured to provide a wireless remote signal directing the mobile robotic device to immediately return to the stationary charging device; and
  three buttons of a button input configured, in a control mode, to provide a wireless remote signal of direct control commands to immediately move the mobile robotic device forward, left, and right;
  wherein the three buttons of the button input are configured, in a scheduling mode, to receive:
    an operator's input of schedule information for the mobile robotic device to leave the stationary charging device to operate autonomously according to a delay determined by at least one of a selected time, a selected date, or a selected day;
at least one transmitter for transmitting from the hand-held remote device to at least one of the mobile robotic device and the stationary charging device; and
a switch to toggle the hand-held remote device between the control mode and the scheduling mode;
wherein the processor on the mobile robotic device is configured to receive a command, representative of the schedule information from the hand-held remote device, and control the mobile robotic device to leave the stationary charging device according to the schedule information.
2. The system of claim 1, wherein the mobile robotic device is configured to transmit information to the remote hand-held device via communication connections.
3. The system of claim 1, wherein the command is representative of configuration information.

4. The system of claim 1, wherein the hand-held remote device includes a display to display an operator's input of the schedule information.

5. The system of claim 1, wherein the mobile robotic device comprises a memory for storing information.

6. The system of claim 1, wherein the switch is a flip lid.

7. The system of claim 6, wherein the flip lid toggles the hand-held remote device into the control mode when the flip lid is in a closed position and wherein the flip lid toggles the hand-held remote device into the scheduling mode when the flip lid is in an open position.

8. A method of controlling a mobile robotic device comprising a processor, the method comprising:
providing a stationary charging device to which the robotic device returns;
providing a hand-held remote device separate from the mobile robotic device, the hand-held remote device comprising:
a start button configured to provide a wireless remote signal directing the mobile robotic device to immediately start an autonomous mission by leaving the stationary recharging device;
a dock button configured to provide a wireless remote signal directing the mobile robotic device to immediately return to the stationary charging device; and
three buttons of a button input configured, in a control mode, to provide a wireless remote signal of direct control commands to immediately move the mobile robotic device forward, left, and right;
wherein the three buttons of the button input are configured, in a scheduling mode, to receive:
an operator's input of schedule information for the mobile robotic device to leave the stationary charging device to operate autonomously according to a delay determined by at least one of a selected time, a selected date, or a selected day;
at least one transmitter for transmitting from the hand-held remote device to at least one of the mobile robotic device and the stationary charging device; and
a switch to toggle the hand-held remote device between the control mode and the scheduling mode;
wherein the method further comprises sending a command representative of the schedule information from the hand-held remote device to the processor on the mobile robotic device, the mobile robotic device receiving the command at the processor, thereby controlling the mobile robotic device to leave the stationary charging device according to the schedule information.

9. The method of claim 8, further comprising transmitting information from the mobile robotic device to the hand-held remote device via communication connections.

10. The method of claim 8, wherein the command is representative of configuration information.

11. The method of claim 8, wherein the mobile robotic device comprises a memory for storing information.

* * * * *